(12) United States Patent
Yakacki

(10) Patent No.: US 11,352,561 B2
(45) Date of Patent: Jun. 7, 2022

(54) LIQUID CRYSTAL POLYMER DEVICE AND METHOD

(71) Applicant: The Regents of the University of Colorado, a body corporate, Denver, CO (US)

(72) Inventor: Christopher M. Yakacki, Denver, CO (US)

( * ) Notice: Subject to any disclaimer, the term of this patent is extended or adjusted under 35 U.S.C. 154(b) by 0 days.

(21) Appl. No.: 16/659,345

(22) Filed: Oct. 21, 2019

(65) Prior Publication Data
US 2020/0283683 A1 Sep. 10, 2020

Related U.S. Application Data

(63) Continuation of application No. PCT/US2018/028940, filed on Apr. 23, 2018.

(60) Provisional application No. 62/488,692, filed on Apr. 21, 2017.

(51) Int. Cl.
*C08F 122/20* (2006.01)
*C09K 19/38* (2006.01)
*C09K 19/04* (2006.01)

(52) U.S. Cl.
CPC ........ *C09K 19/3852* (2013.01); *C08F 122/20* (2013.01); *C08F 2810/20* (2013.01); *C09K 2019/0448* (2013.01)

(58) Field of Classification Search
CPC ........ C09K 19/3852; C09K 2019/0448; C09K 19/00; C09K 19/38; C08F 2810/20; C08F 122/20
See application file for complete search history.

(56) References Cited

U.S. PATENT DOCUMENTS

| 6,534,135 B1 * | 3/2003 | Cherkaoui | C07B 37/10 570/183 |
| 2013/0296505 A1 * | 11/2013 | Verduzco | B29C 71/0072 264/340 |
| 2016/0009863 A1 * | 1/2016 | Yakacki | B29C 61/003 264/230 |

OTHER PUBLICATIONS

Azoug, Polymer, 98, (2016) p. 165-171 (Year: 2016).*
Ahn, Extreme Mechanics Letters, 5 (2015) p. 30-36 (Year: 2015).*

* cited by examiner

*Primary Examiner* — Robert C Boyle
(74) *Attorney, Agent, or Firm* — Winstead PC

(57) ABSTRACT

Liquid crystal polymers (LCPs) are described herein that include novel arrangements of bio-mimicking properties for use in surgery, therapy, and treatment of medical or comfort issues. Through the particular arrangements medical devices and portions of them may be adapted to have properties that dampen and dissipate vibrations such as shocks to body tissues during surgical recovery and/or during subsequent use. This dampening is attained by novel arrangements of LCP and processes for forming them that vary from prior attempts at synthesizing activated LCP elements. These novel arrangements include using LCP bodies that include thicknesses and properties that have not been demonstrated or achieved for medical or other purposes and that are achieved using distinct processes. These novel LCP arrangements and methods of creating them can produce medical devices that bio-mimic natural tissue or operation to provide better results for patients.

12 Claims, 12 Drawing Sheets

LIQUID CRYSTAL POLYMER DEVICE AND METHOD

RELATED APPLICATIONS

This is patent application is a continuation application under 35 USC 120 of International Application serial number PCT/US18/28940, entitled "LIQUID CRYSTAL POLYMER MEDICAL DEVICE AND METHOD," and filed Apr. 23, 2018, which claims priority to U.S. Provisional Patent Application Ser. No. 62/488,692, entitled "LIQUID CRYSTAL POLYMER MEDICAL DEVICE AND METHOD," and filed Apr. 21, 2017, and the disclosure of these applications is hereby incorporated by reference in its entirety for all purposes.

FIELD OF THE TECHNOLOGY

Embodiments of this disclosure relate to creating liquid crystal polymer medical devices.

SUMMARY OF THE DESCRIPTION

Liquid crystal polymers (LCPs) are described herein that include novel arrangements of bio-mimicking properties for use in surgery, therapy, and treatment of medical or comfort issues. Through the particular arrangements, medical devices and portions of them may be adapted to have properties that dampen and dissipate vibrations such as shocks to body tissues during surgical recovery and/or during subsequent use. This dampening is attained by novel arrangements of LCP and processes for forming them that vary from prior attempts at synthesizing activated LCP elements. These novel arrangements include using LCP bodies that include thicknesses and properties that have not been demonstrated or achieved for medical or other purposes and that are achieved using distinct processes. These novel LCP arrangements and methods of creating them can produce medical devices that bio-mimic natural tissue or operation to provide better results for patients.

LCPs and elastomers are described herein that exhibit these properties when tuned specifically for bio-mimicking properties can be arranged into a medical device such as for use as an implant in a human to mimic a particular tissue or set of tissues and/or for use outside the body in assisting a human with rehabilitation or movement. The particular LCP property of dampening is arranged in one embodiment into a medical device that dampens spinal forces in a bio-mimicking manner using tuned LCP bodies. In some embodiments, only a portion of the medical device that is adapted for use inside and/or outside the patient's body is constructed of LCP. In some embodiments, an entire medical device is constructed from LCP. Therefore, the disclosure herein includes techniques for constructing devices from LCP in load bearing embodiments that both are substantially thicker than described by existing LCP literature and are also tunable with respect to properties within three dimensions. Furthermore, new combinations of LCP properties may be tailored into portions of the resulting medical devices. For example, while dampening is tuned to encompass a broader working region via manipulation of the glass transition temperature (Tg) and the isotropic transition temperature (Ti), further tailoring may be created in the same or different portions of the LCP portion of the medical device that create moduli that are bio-mimicking in their load-bearing performance. By using the novel LCP formation techniques medical devices can be produced that maintain dampening while providing sufficient moduli.

Research into the methods described herein was initially enabled by recent research breakthroughs as described in U.S. patent application Ser. No. 14/754,685 describing novel controllable and scalable LCP synthesis processes via scalable click process to provide three-dimensional LCP bodies for use in orthopedic applications. These new synthesis techniques opened new pathways for experimentation in main-chain LCP polymerization and scalable manufacturing of devices in truly three-dimensional formats. Thus, novel initial explorations are described herein for exploring ways to tune the complex modulus of LCPs to match the properties of human tissue dissipation in orthopedic applications. These new synthesis techniques allow for control over properties that allow for orthopedic properties such as dampening that mimics biological tissue samples better than previous polymer networks.

As described further herein, the ability to tune the complex modulus while maintaining dissipation over the operating range of the LCP body was a key goal in exploring dissipation that supports use in orthopedic applications. A major departure from prior research is the present disclosure's focus on LCP dissipation as opposed to LCP actuation. The resulting process changes provide a surprisingly novel approach for maintaining isotropic-like properties while in a polydomain nematic phase of the LCP and, at the same time, sacrificing typically-beneficial properties of strain-storage and actuation between states.

Only recently has LCP research surpassed the prior limits of use of the physical properties of LCPs in thin devices that were studied for activation via two-way shape memory along one axis. These shape-memory activations have focused on tissue replacement for activated tissues that use two-way shape memory to mimic active tissues, such as muscles in a human body. These tissues are typically designed for activation along one axial direction of response. However, these studies have not and could not have comprehended the techniques enabled later by the development of the scalable "click" reaction for producing LCPs or the antithetical needs for dissipative devices in these scalable formats.

While prior research has focused on thin films and actuation, research related to the above-mentioned prior application were the first to create samples large enough to replicate the size of the tissue for orthopedic devices. For example, as described further herein, an LCP medical device may be made of two different portions LCP that are polymerized differently. For example, a center portion of a vertebral disc may be polymerized so as to be more dampening and softer than an annular ring surrounding the center perpendicular to a supporting direction of the intervertebral disc. These adjustments to processes have been developed under the present disclosure's further exploration into the nature of polymerization processes to control the formation of novel polydomain nematic elastomer (PNE) liquid crystal polymer (LCP) bodies that achieve new levels of dissipation over a frequency range while maintaining a storage modulus sufficient for the orthopedic purpose. The particular formation of the PNE LCP body may be controlled as described further herein to match and/or mimic body tissue in its complex modulus response to orthopedic stimulus. Medical devices are described herein that include multiple materials for dynamic response as well as interfacing with the patient.

In several embodiments described further herein, the PNE LCP portion of a medical device may be polymerized using certain methods so as to mimic many features of an intervertebral disc, including important mechanical properties such as dissipation of impact forces while maintaining a low storage modulus. In the example of an intervertebral disc, the portions may be differentially polymerized such that the central portion is produced in an isotropic PNE (i-PNE) configuration, as described further herein for a softer central portion that maintains dissipation, and an exterior annular ring with either i-PNE of a different chemistry (e.g., created with separate chemistry from the central portion) or a different polymerized structure such using an nematic PNE (n-PNE) portion of the same or a different mesogen chemistry.

Until now studies that have explored LCP formulation and properties have failed to acknowledge the differences between n-PNE and i-PNE structures with respect to the complex modulus behavior, ignoring the effects of this dynamic behavior over ranges of temperature and frequency. The few studies to acknowledge even the existence of these different types of structures of PNE have only compared their characteristic times for response to actuation, which is further antithetical to the herein-described use of a PNE which destroys any ability to actuate the LCP body macroscopically. No prior studies have suggested the existence of the differences in complex modulus over the same temperature ranges, nor the methods of advantageously using the same for creating a novel scalable orthopedic medical device beyond the prior applications of an actuated soft tissue. Therefore, the descriptions herein provide novel uses and analyses of PNE LCP bodies.

Provided herein are systems and methods for polymerizing and programming a LCP such as a liquid crystal elastomer (LCE).

In one aspect, the disclosure describes a medical device including an LCP portion of the medical device with the LCP portion having a glass transition temperature (Tg) below a body temperature of a patient. The medical device includes the LCP portion that exhibits a tan delta of the medical device at 1 Hertz and a storage modulus of the medical device at 1 Hertz. The LCP portion of the medical device is adapted to cause the medical device to exhibit to a maximum ratio of the tan delta to the storage modulus that is greater than 0.5 for temperatures of the LCP portion above the Tg.

In another aspect, the disclosure describes a method including receiving a target complex modulus for an LCP dampening portion of an orthopedic medical device, the target complex modulus for the LCP dampening portion including a storage modulus component thereof and an loss modulus component thereof, each selected to achieve a physiological matching of the complex modulus that maintains a ratio of tan delta to the storage modulus such that the ratio achieves a maximum that is greater than 1 inverse MPa while the LCP dampening portion is at a temperature that is beyond a glass transition temperature of the LCP dampening portion. The method further includes selecting a LCP synthesis process for creating the LCP dampening portion that allows the orthopedic medical device to achieve the physiological matching. The selecting of the LCP synthesis process includes, selecting a solution chemistry for creating the LCP portion that will create an i-PNE structure that maintains the physiological matching of the complex modulus based on a selected cross-linking temperature. The selecting of the LCP synthesis process also includes, selecting the cross-linking temperature at which cross-linking occurs to create the i-PNE structure in the LCP portion without a fixed arrangement of polydomains therein while the LCP portion is below an isotropic temperature for the LCP portion. The method further includes creating the LCP dampening portion with the selected solution chemistry and cross-linking temperature.

In one embodiment, the disclosure describes that the portion of the LCE body is a first portion of the LCP body, and the method further includes causing a second polymerization in a second portion of the LCP body and thereby producing in the second portion of the LCP a second different complex modulus response. In several embodiments, a body with a first polymerization and a second body with a second polymerization may be included in a single medical device, such as in an assembled, arranged, patterned, layered, or another configuration.

Other embodiments and features of the present disclosure will be apparent from the accompanying drawings and from the detailed description which follows.

DETAILED DESCRIPTION OF THE DRAWINGS

The following description and drawings are illustrative and are not to be construed as limiting. Numerous specific details are described to provide a thorough understanding. However, in certain instances, well-known or conventional details are not described to avoid obscuring the description. References to one or an embodiment in the present disclosure are not necessarily references to the same embodiment; and, such references mean at least one. Reference in this specification to "one embodiment" or "an embodiment" or the like means that a particular feature, polymer structure, design structure, or characteristic described in connection with the embodiment is included in at least one embodiment of the disclosure. The appearances of the phrase "in one embodiment" or the like in various places in the specification are not necessarily all referring to the same embodiment, nor are separate or alternative embodiments mutually exclusive of other embodiments. Moreover, various features are described that may be exhibited by some embodiments and not by others.

Figure 1:
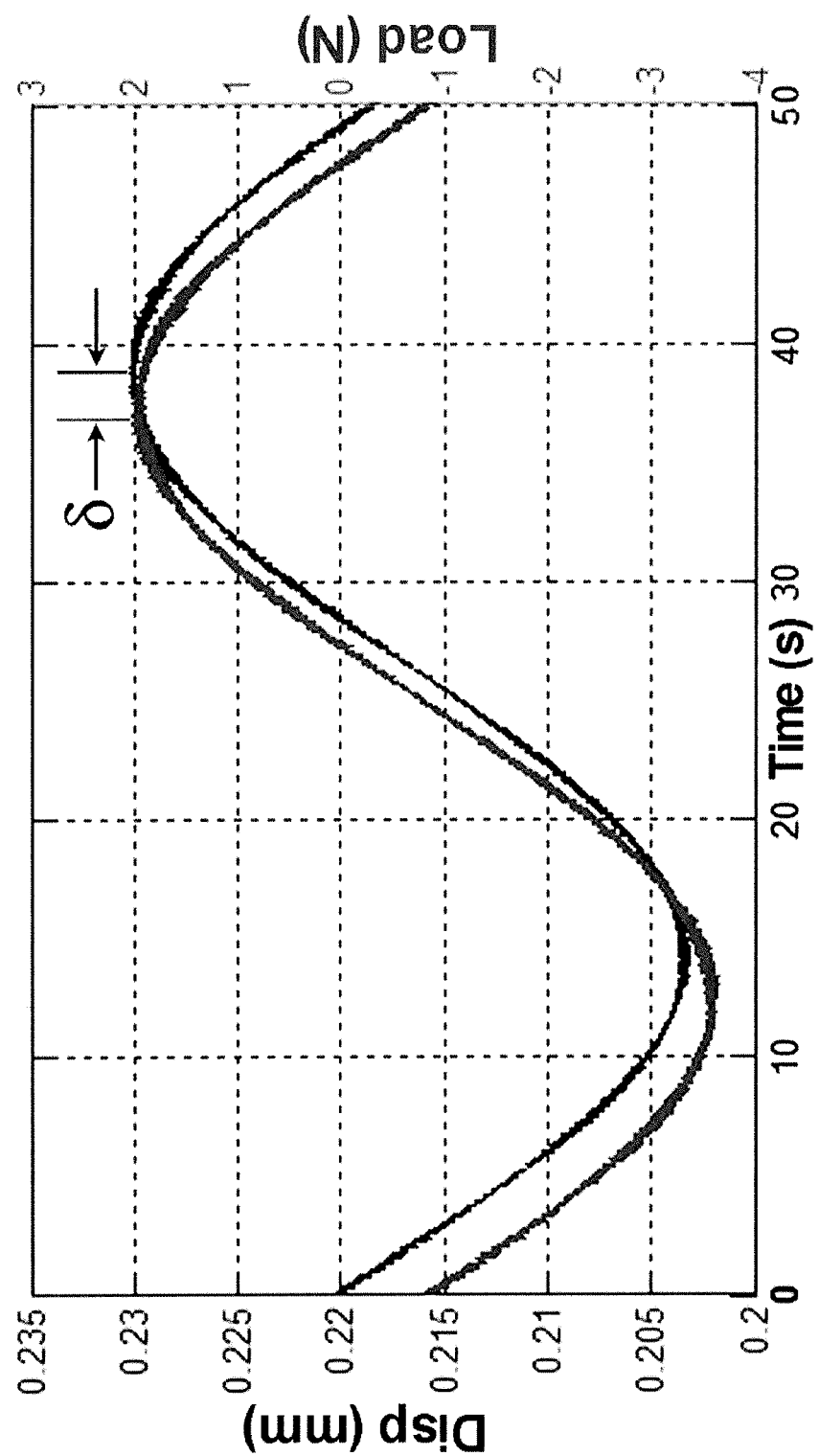
FIG. 1 shows exemplary data of a stress-strain response of a material as it is repeatedly stretched over time, illustrating a phase lag angle (delta) between the stress curve and the strain curve.

FIG. 1 shows exemplary data of a stress-strain response of a material as it is flexed over time, illustrating a phase lag angle (delta) between the stress curve and the strain curve. These curves illustrate a material's response to a cyclical stretching.

Tan delta is represented as the ratio of the loss modulus to the storage modulus of the material (or the imaginary portion of the complex modulus divided by the real portion). The term delta, as shown in FIG. 1 is also considered a phase lag (e.g., angle difference) between a stress impulse and the strain response of the body in a dynamic modulus analyzer. While these measurements of complex modulus provide a clean mathematical description of the dynamic response of the newly created LCP body, the description herein uses an arbitrary measure of merit (e.g., a ratio defined herein of tan delta to storage modulus) that allows for measurement of the ability to dissipate properly the dynamic stress loads of various orthopedic tissue applications. For example, the dynamic response required by a knee replacement or a vertebral disc replacement to dissipate the dynamic loads induced by a patient's body may be complex in nature and require specific dynamic tuning of the device's properties.

Therefore, tan delta rising above zero indicates that the loss modulus of the material at that temperature and frequency has risen above zero and the material is dissipating kinetic energy as inelastic losses. The rise above tan delta equal to zero demonstrates a viscoelastic process occurring in the polymer (i.e., a non-zero imaginary loss modulus) while the polymer body responds to the dynamic stress, represented by a sinusoidal motion (stress) and reactive strain. This stress-strain relationship may be represented by a measurement of delta or phase lag in radians between the two waves.

Presented herein are the results of research pursuing new goals for LCP bulk synthesis for orthopedic devices, including complex modulus shaping with increased tan delta and maintained storage modulus in an operating range above the glass transition temperature. Disclosed herein is a researched and arbitrarily defined ratio of the tan delta (ratio of loss modulus to storage modulus components of the complex modulus) and the storage modulus. This effectively monitors the loss portion of the complex modulus being tuned while the device maintains sufficient storage modulus for orthopedic applications. This ratio of the LCP properties is not dimension-less. Instead the ratio is expressed herein with units of inverse MPa or $MPa^{(-1)}$.

Figure 2:
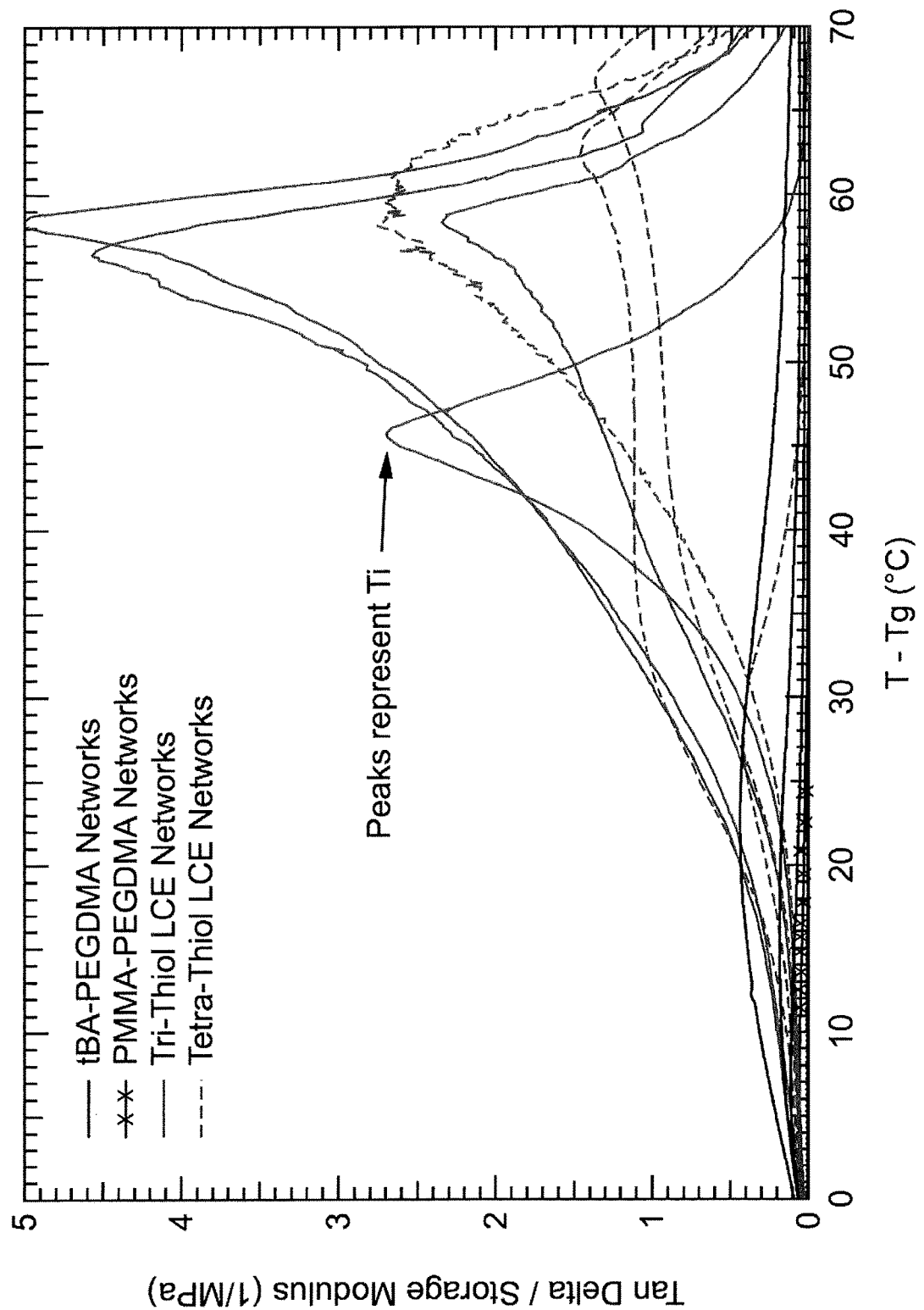
FIG. 2 shows a graph of the measured ratio between tan delta and storage modulus as measured for temperatures above Tg for various polymers.

FIG. 2 shows a graph of the measured ratio between tan delta and storage modulus as measured for temperatures over Tg for various polymers. For comparison between the polymers, the ratios are shown normalized to Tg (i.e., T-Tg). As shown, there are significant differences between the ratios expressed by the different networks, particularly as the normalized temperature of the networks rise significantly over Tg. The ratios for the LCP networks (shown in red) rise dramatically above a ratio of 1 $MPa^{(-1)}$ whereas the maximum of any other networks barely peak at 0.5 $MPa^{(-1)}$.

In several embodiments described herein, LCP bodies are formed to create these differences in ratios between the shown LCP bodies with peak ratios of 1, 2, 3, 4, and even as high as a ratio of 5 $MPa^{(-1)}$ for temperatures well above the Tg for the polymer. This difference is achieved and enforced by performing various deviations from prior processing techniques from which the prior art has heretofore taught away. However, using novel techniques described herein for producing i-PNE LCP bodies, the ratios described herein have been achieved in scalable three-dimensional orthopedic-scale devices.

The ratios described herein for i-PNE LCPs are not exceeded by any known copolymers used for medical devices, including orthopedic devices. These copolymers may be produced so that their active working temperatures include the region around the glass transition temperature where the loss modulus is high and the storage modulus remains moderate. However, with these materials, the range of dissipation provides only a narrow range of temperatures for the working specifications of any resulting medical device, so this application seeks further temperature range for orthopedic use of LCP via novel techniques of LCP synthesis. The novel devices described further herein provide greater dissipation and novel extended temperature ranges for the dissipation to occur, and these device characteristics are particularly designed by the polymerization processes described further herein to match the physiological properties such as the complex modulus to those needed for an orthopedic device installed in a patient.

The measured ratio provides a tangible measurement of how the loss modulus of the LCP continues to dissipate energy through viscoelastic behavior of the LCP portion while the LCP portion has different operating temperatures. This requirement is particularly created herein with these units for tracking how the LCP portions are able to maintain dissipation over temperatures beyond previous capabilities of LCP portions and, indeed, all conventionally crosslinked polymers. Furthermore, the ratio described herein may be directly measured on a target LCP portion, in order particularly to point out the novel features of the LCP portions created with processes herein.

Figure 3:
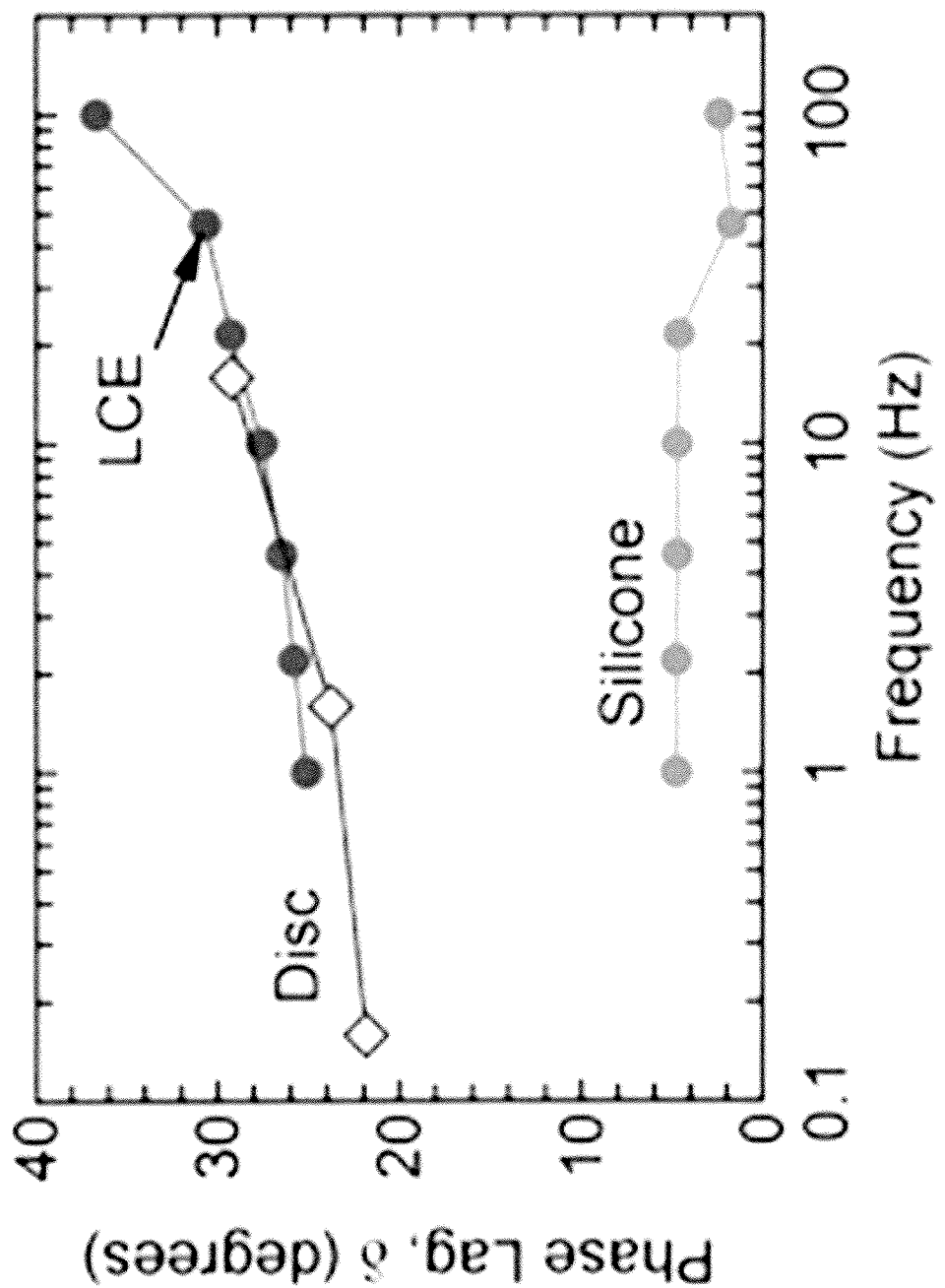
FIG. 3 shows an exemplary illustration of a measurement of phase lag angle (delta) in degrees representing dissipation of the material versus frequency of stimulus for various materials, showing an overlapping between properties of a patient's intervertebral disc and an exemplary LCE.

FIG. 3 shows an exemplary illustration of a measurement of phase lag angle (delta) in degrees representing dissipation of the material versus frequency of stimulus for various materials, showing an overlapping between properties of a patient's intervertebral disc and an exemplary LCE. This exemplary data shows phase lag angle (delta) as measured over frequency for various materials, including novel bio-mimicking LCP materials described herein. The maintenance of tan delta by the networks described herein over a range of frequencies provides a new dimension for adapting an LCP body for bio-mimicking purposes.

In an orthopedic application, the components of the stress waves encountered have frequency components that may be induced by the source of the impact stress and/or by the patient or implant type. The frequency components of the shock induce various responses from that are complex and analyzed further herein to create novel bio-mimicking materials. Therefore, the bio-mimicking properties of a material are better fit if the shown phase angle (representing dampening or dissipation) match over a range of relevant frequencies, as shown. For example, while LCE or LCP portions may be matched to mimic biological materials such as the intervertebral disc shown, other polymers such as silicone cannot match the dissipation properties as described herein.

The dampening features of a body in three dimensions may require different moduli across different portions of the device, such as for example, in a vertical support roll as illustrated. Thus, for orthopedic devices, there is a need to classify and control these dissipations across the area under load in the device (e.g., an entirety of a surface of the device).

For the present disclosure, a test frequency of 1 Hertz has been used for comparing measurements of the complex modulus, such as the tan delta and the storage modulus portion of the complex modulus. The tan delta calculated herein is the ratio of the loss modulus portion of the complex modulus (otherwise referred to as the inelastic or imaginary portion of the complex modulus) divided by the storage modulus portion of the complex modulus (otherwise referred to as the elastic or real portion of the complex modulus). Each of these moduli are related to the delta or the phase lag (in radians) between the stress and strain exhibited while the operational polymer is under cyclical stress.

The ability to create a three-dimensionally scalable LCP body has provided a doorway through which the present new research was enabled to discover a different manner in controlling dissipation while maintaining storage modulus through modifying fine details about the polymerization processes for creating these three-dimensionally scalable LCP bodies. Specifically, the present embodiments of devices could not have been explored by previous methods, which only could create thin film samples, typically less than 200 μm in thickness, which could not be scaled up for bulk orthopedic applications, and which were taught to use the alignment of LCPs for actuation. However, whereas the prior research had relied on alignment of structures within the LCP, the present disclosure makes available new properties for dissipation by the LCP body by removing alignments from the polymerization processes that are described further herein. In several embodiments, refinements to the polymerization processes include an embodiment of selectively crosslinking mesogens under certain states to create selectively i-PNE domains with extended nematic behavior plateaus as compared to LCP bodies using the same LCP chemistry but are instead polymerized with n-PNE structures.

As described further herein, controlling crosslinking of the LCP may be created through several methods, by creating different portions of an LCP body with different i-PNE and n-PNE properties. These methods include controlling a combination of synthesis parameters for portions of the LCP, including during mixing and while crosslinking. For example, while crosslinking a mesogens (e.g., RM257) outside of the presence of a solvent (e.g., toluene) the temperature at which each portion of the device is crosslinked may be controlled to create either isotropic-PNE or nematic-PNE portions of the bulk LCP body. In some embodiments, a particular mixture of isotropic and/or nematic crosslinking portions may be contained within the bulk LCP body. In some embodiments, portions of the bulk LCP body include both isotropic and nematic crosslinking statistically distributed based on a temperature at crosslinking of that portion, such as via adding a crosslinking initiator or catalyst to a mesogen mixture near the isotropic temperature (e.g., within 5 degrees Celsius).

These crosslinking portions control the viscoelastic properties of the resulting LCP body. As described further herein, isotropic crosslinking and nematic crosslinking using the LCP bulk processing techniques herein create different complex modulus effects that allow further matching for the resulting properties to the orthopedic goals for the device. For example, expanding the range while the imaginary portion of a complex modulus of the LCP portion may be extended by controlling the proportion of i-PNE structure created during cross-linking as described further herein. By causing such shifts in crosslinking, the dissipation of the LCP may be maintained while the device exhibits a modulus that may match an orthopedic tissue, such as a vertebral disc or cartilage.

Figure 4:
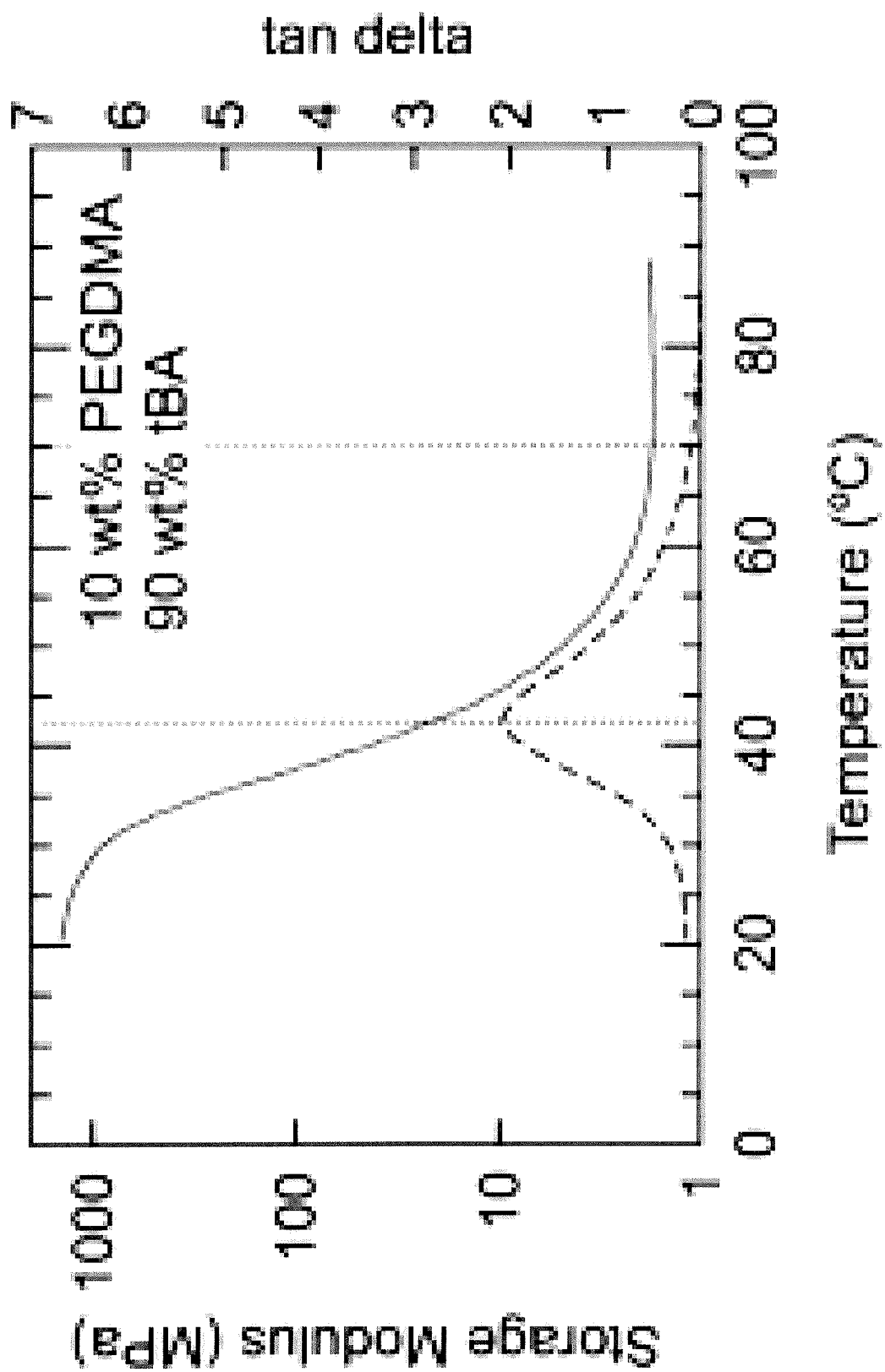
FIG. 4 shows, for comparison, a tan delta and modulus measurements for a glass transition of an exemplary amorphous network.

FIG. 4 shows, for comparison, a tan delta and modulus measurements for a glass transition of an exemplary amorphous network. Near Tg the amorphous network exhibits a peak in tan delta and the amorphous network sample fails to retain significant storage modulus after Tg.

Similarly, to these amorphous networks, the viscoelastic properties of n-PNE LCPs typically have large drop-offs of the tan delta after Tg. The focus of prior studies on actuation and shape memory of LCP have hidden the dynamic and macroscopic properties achievable by careful control of polymerization to intentionally destroy the prior goals for LCP of actuation and shape memory. The different foci of prior studies including shape memory, actuation, (e.g., between strain states) and programming changes between temperature dependent properties, such as birefringence, other optical properties, or other applications where alignments are taught and which teach away from isotropic states of the liquid crystal polymers. Each of these efforts have all obscured the utility of controlling macrostructures of the created PNE via careful control of the polymerization as described further herein.

Figure 5:
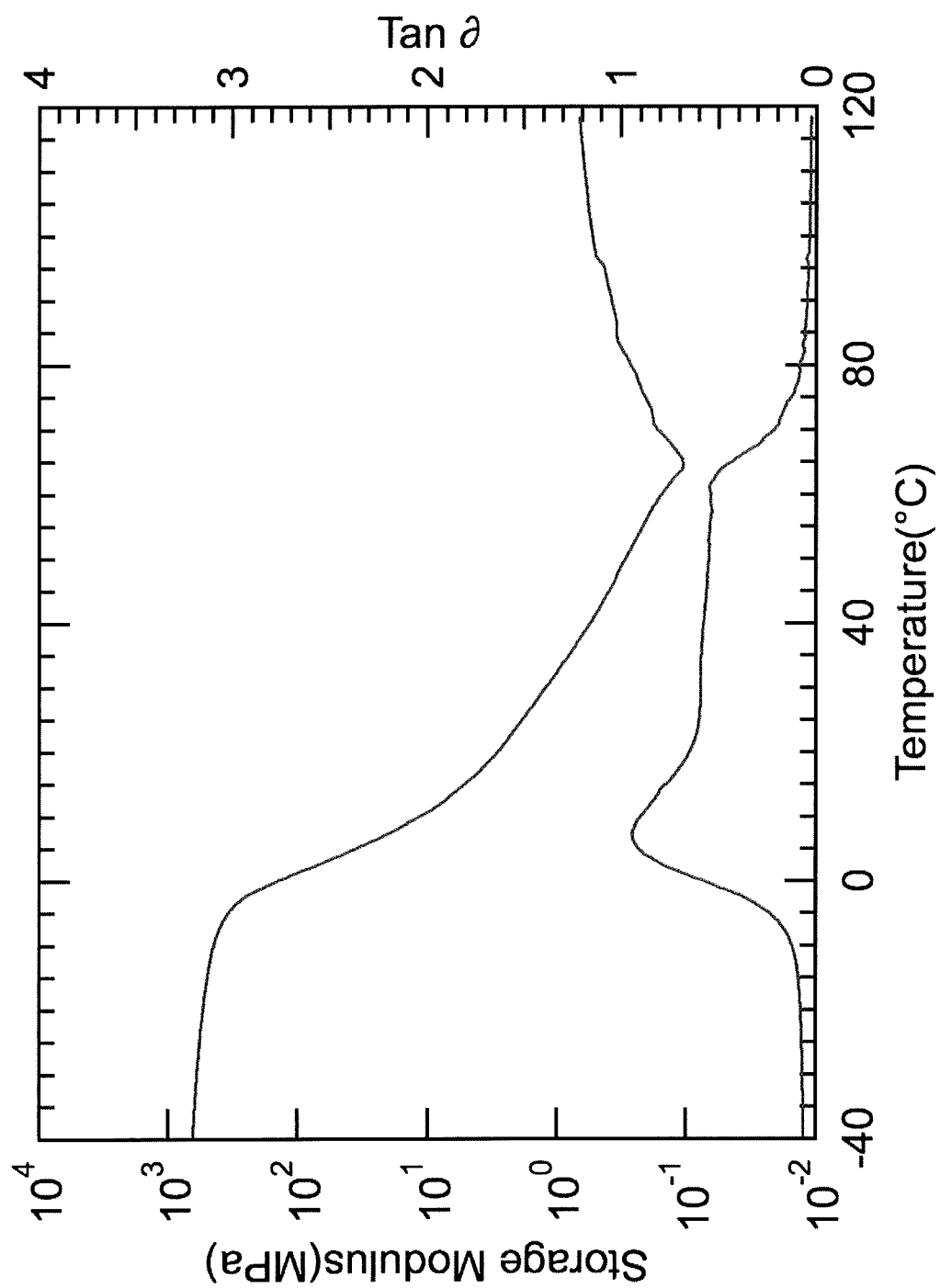
FIG. 5 shows a tan delta measurement for an exemplary embodiment of an LCP body crosslinked as described herein to create i-PNE structure and expanded temperature range of dissipation between Tg and Ti.

FIG. 5 shows a tan delta measurement for an exemplary embodiment of an LCP body crosslinked as described herein to create i-PNE structure and expanded temperature range of dissipation between Tg and Ti. By sharp contrast to other materials described herein, these i-PNE LCP portions demonstrate a raised tan delta value throughout a broad range of temperatures between Tg and Ti. As described further herein, this broadened range of increased tan delta is coincident with maintaining a substantial storage modulus, such as 1-20 MPa throughout the range of increased tan delta. Because of these novel methods of controlling these coincident properties, medical devices with novel ratios of these properties may be created using the methods described herein to create novel ratio combinations of these properties in devices. These advances were unavailable to be utilized before exploration of these techniques for LCP creation became available recently based on use of new methods for formulating and creating three-dimensionally-scalable LCP bodies.

Embodiments of medical devices herein may be created such that, for operating temperatures above Tg and below Ti, the ratio of tan delta to storage modulus remains greater than 0.5 inverse MPa or $MPa^{(-1)}$. As described further herein, these ratios have not been explored before with respect to LCP formation and are presented herein for the first time in order to describe the new features for which LCP bodies may be used, namely expanded temperature range dissipation. These described ratios have not been achieved before for any LCP bodies and these ratios provide significant and measurable improvement in bio-mimicking of human tissue.

As shown in FIG. 5, the range of tan delta and storage modulus demonstrated with the processes herein have created i-PNE LCP bodies with ratios from 0.5 to 2.0 inverse MPa or MPa$^{(-1)}$ or greater for operational ranges falling between Tg and Ti. This improved response, as expressed in these ratios, may be maintained while the LCP is above its Tg and below its Ti, as described further herein.

As generally described in prior work by the same inventors for producing an LCP via a separate stepped thiol-acrylate "click" synthesis reaction, LCP bodies may be created in scalable three-dimensional shapes. As distinctly described herein, the modifications to the LCP formation process result in preferential formation of i-PNE portions of LCP rather than portions with large-scale nematic ordering enforced during the "click" reaction. For example, when crosslinking is performed as described herein while mesogens are substantially above the isotropic temperature (or above an isotropic finish temperature) or in the presence of a solvent, there is no formation of n-PNE, and the functions of the click related to alignment in the n-PNE are destroyed. Therefore, while initial research focused on "click" reactions and creating order between process steps in the polymerization of the network, the present disclosure selects an entirely different set of polymerization processes for creating a different set of properties in the LCP portion.

The creation of the i-PNE as described herein is inapposite to the disclosure of click reactions formed for the purpose of creating an ordered structure or ability for actuation in the network before the click reaction is completed. Instead, click reactions may be used for different purposes consistent with the present disclosure, for example to delay the described polymerization processes while creating the described PNE. However, the process steps relating to the formation of different forms of the PNE (e.g., i-PNE vs. n-PNE). Therefore, the i-PNE LCP bodies described herein and their disclosed ratios of tan delta to storage modulus exhibited while the LCP is between Tg and Ti teach a separate method of LCP formulation for including within a medical device.

As described further herein, different portions of a medical device may include LCP bodies that have different properties. These modifications to the LCP can be used with other portions of the intended medical device to adapt the entire medical device for proper orthopedic response. For example, the complex/dynamic modulus of the medical device will be a combination of the elastic/storage/real modulus portion and the loss/inelastic/imaginary modulus portion of the overall complex/dynamic modulus of the medical device. As described further herein, the properties of the LCP body may be adapted to combine with the complex modulus of the entire medical device, and some descriptions will relate to the complex modulus of the LCP portion alone.

Figure 6:
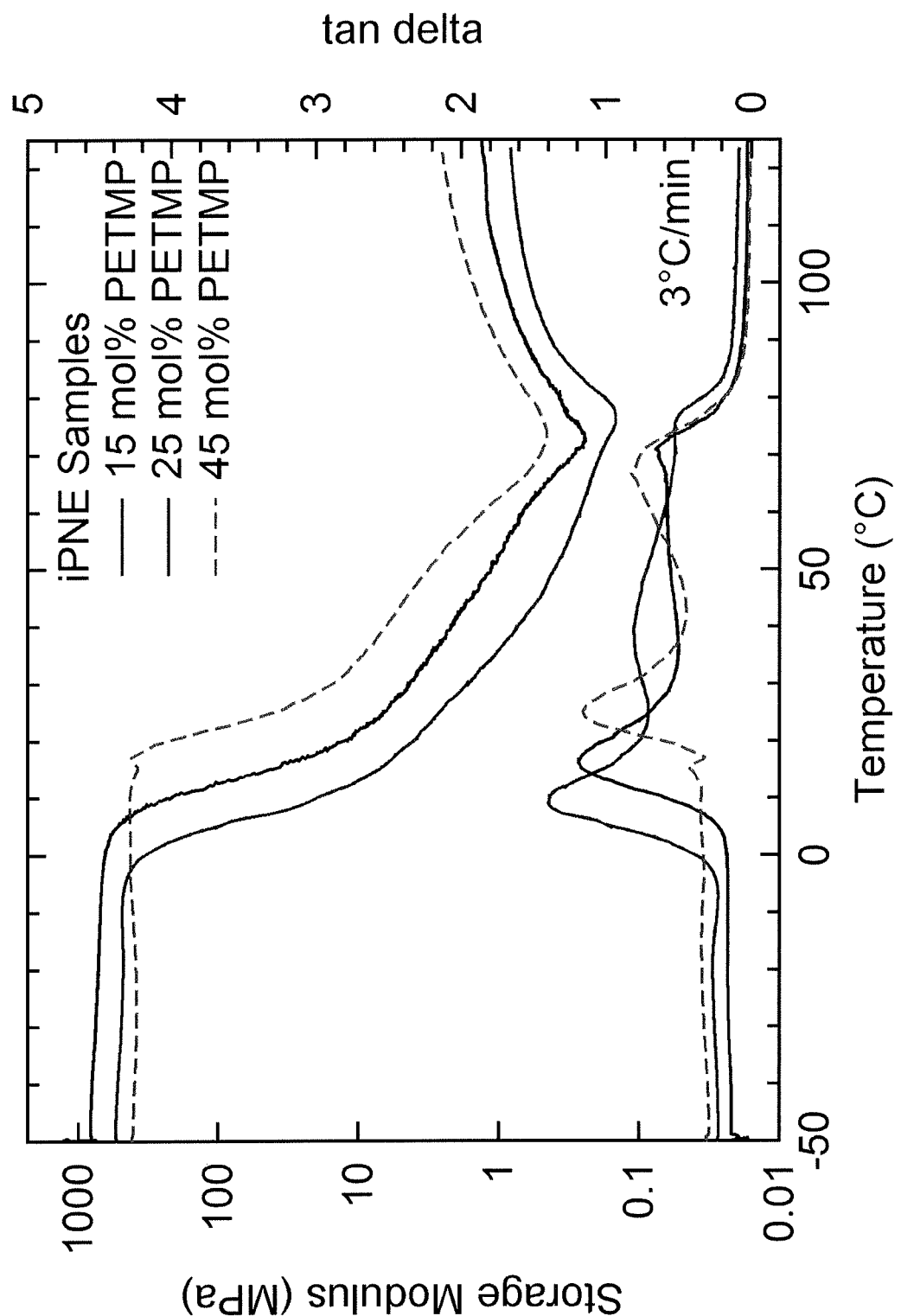
FIG. 6 shows various embodiments of i-PNE that may be selected or created using different chemistries and using the described methods for polymerizing a mixture of mesogens such that an i-PNE LCP body is formed with a specified storage modulus that further has an expanded temperature range with elevated tan delta.

FIG. 6 shows various embodiments of i-PNE that may be selected or created using different chemistries and using the described methods for polymerizing a mixture of mesogens such that an i-PNE LCP body is formed with a specified storage modulus that further has an expanded temperature range with elevated tan delta. As described further herein, the embodiments of this method provide significant dissipation of orthopedic forces while maintaining a sufficient nematic storage modulus for the target orthopedic application. By causing crosslinking in the isotropic state, an LCP body formed as described herein will create, when below the isotropic transition temperature, a polydomain nematic elastomer that will not contain a programmed alignment within the domains, therefore inhibiting the heretofore sought after alignment properties allowing for actuation and/or shape change.

This method significantly distinguishes over the prior methods of enforcing alignment, which is required to create mechanical actuation by an LCP body. As described further herein, prior techniques rely on creation of aligned polymeric structures to create certain properties such as mesogen alignment, optical properties, actuation properties, and/or shape memory effects. By sharp contrast, the below embodiments of methods intentionally prevent and/or remove these macroscopic alignments from the polymerized LCP bodies, and instead substitute heretofore denigrated techniques in order to create i-PNE structures in the LCP bodies. These i-PNE LCP structures have been denigrated in the past because alignment is required for many optical and actuation properties to exist in the resulting LCP bodies. Instead, by contrast, in i-PNE portions created with the embodiments herein, there are no enforced order of methods described herein. The techniques herein render the i-PNE LCPs created ineffective for applications using alignment such as optical or actuation applications. Therefore, the prior investigations into PNEs teach away from using LCP for orthopedic devices as described herein because prior methods for creating LCPs. Indeed, because several factors are required to create n-PNE, the prior investigations explicitly teach avoiding the steps described herein to create i-PNE into an LCP medical device for orthopedic applications.

Two contrasting embodiments are described herein for enforcing formation of a particular type of liquid-crystalline structure (e.g., n-PNE or i-PNE) in the LCP bodies that are created. These techniques are developed explicitly to enforce a type of structured order (or lack thereof) while the crosslinked LCP body is below the isotropic state. Each of these embodiments described herein includes methods of controlling the self-organization of the mesogens (e.g., liquid-crystalline order) while cross-linking the LCP body.

A first process embodiment uses a solvent to control the occurrence of self-organization (e.g., liquid-crystalline order) of the mesogens while the LCP body is synthesized. In one embodiment, the LCP networks are cross-linked before the solvent is removed. Using the techniques described further herein, this cross-linking in the presence of an appropriate solvent enforces an i-PNE LCP structure in the resulting LCP body.

A second process embodiment uses temperature to control the occurrence of self-organization of the mesogens during synthesis while nematic self-ordering of mesogens is disallowed by the mesogens being over the Ti. As described further herein, the addition of a cross-linking catalyst/initiator allows cross-linking to occur while the mesogens are above an isotropic transition temperature Ti. In another alternative embodiment, in order to create n-PNE structures, the cross-linking is initiated while the mesogens are below their isotropic transition temperature. For example, a mixture of one or more mesogens(s) may be heated for mixing and then the mixture may be cooled below the isotropic transition temperature of the mesogens before cross-linking is initiated, such as by an added crosslinker and/or an added initiator and/or by activating the initiator (e.g., with light).

As described further herein, both the temperature and solvent process embodiments of methods herein may be understood as ensuring that the mesogens being energetically prohibited from forming self-organized nematic structures during synthesis or crosslinking of the LCP material. In operation, i-PNE bodies will form polydomains of different size and orientation (e.g., with no fixed arrangements) following repeated heatings and coolings around Ti. Other similar embodiments may be adapted from the embodiments of methods described further herein whereby self-organized nematic structures could be disrupted during crosslinking. For example, these self-organized nematic structures during crosslinking may be prohibited by a solvent, a temperature of the mesogens, and/or a (modulated/randomized) electric/magnetic field. The processes described herein may then be used to enforce formation of i-PNE structures while polymerization is achieved. The described polymerization under these conditions of energetic prohibition results in an LCP structure with quenched disorder that is still exhibited inside the operating range between Tg and Ti, and permanently destroys the ability to align the mesogens as required for prior macroscopic uses of LCP bodies.

By creating these i-PNE structures using the described methods, these structures destroy mesogen alignment required for consistent structure (or fixed arrangement) of polydomains exhibited between Tg and Ti. Instead, whenever cooled below its isotropic temperature, the i-PNE LCP bodies formed with these methods will produce a new formation of polydomains within the LCP bodies, thus leading to their description as isotropic polydomain nematic (i-PNE) LCP bodies.

The transition temperatures described herein for the mesogens are not exact temperatures, nor are the transitions between phases of the mesogens or polymers described herein sharp transitions. Rather these transition temperatures may be defined in the literature or theoretically, and in practice may operate over a range as the interactions of the mesogens are energetically distributed statistically around the temperature. Therefore, the term "above" or "below" the transition temperature is meant herein to indicate significant deviation above or below the transition temperature such that the statistical transition between regions of operation is complete or near complete. For example, a transition temperature may indicate a temperature at which the transition has "finished" (e.g., a "finish temperature") at which all the mesogens (or nearly all) has transitioned as described.

In one embodiment, the method for forming an LCP body includes selecting a bio-mimicking a storage modulus to be retained at an operational temperature. This storage modulus may direct the selection of a range of mesogens, a particular mesogen (or combination of mesogens), and/or other components for producing the LCP body. In one embodiment, a desired storage modulus or a desired complex modulus may be selected and that selection may dictate a set of chemistries for producing the LCP body. These chemistries will set an operational temperature range from which process parameters may be selected for producing the LCP body. As described further herein, medical devices may include several different bodies in portions of the device. This may be provided, for example, to create different complex moduli for portions of the medical device, such as in order to biomimic complex body tissues with differing properties across the tissue or in order to provide interfacing of different portions of the device to the patient.

In bodies that require i-PNE LCP properties, the methods described herein for preventing mesogen organization in the LCP during synthesis to create expanded dissipation ranges may be used. Other materials may be used, including an n-PNE LCP structure, or partially-nematic PNE LCP structure, by adjusting the methods described herein for enforcing a degree of alignment order in the mesogens while polymerizing. For example, as described herein with respect to click reactions allowing control over the timing of (portions of) the polymerization processes described herein, timing control that may be used to control the alignment order of the LCP bodies formed thereby. By using an array of the techniques described herein, many different properties of LCP bodies may be combined into a medical device (e.g., with other materials) in order to create complicated and bio-mimicking complex moduli for the medical device and portions thereof.

Exemplary Experimental Chemistry and Method—Using Solvent in Preparation of i-PNE Liquid Crystalline Polymers (Optional Step of Second Stage for Click Reaction)

1. Add 4 g of 4-bis-[4-(3-acryloyloxypropypropyloxy) benzoyloxy]-2-methylbenzene (RM257) into a 30 ml vial. RM257 is a di-acrylate mesogen and is received as a powder. Dissolve RM257 by adding 40 wt % (e.g., 1.6 g) of toluene and heat to 80° C. on a hot plate. This process typically takes less than 5 min to dissolve the RM257 into a solution.

Note: Other solvents can be used to dissolve the RM257, such as dichloromethane (DCM), chloroform, and dimethylformamide; however, toluene was chosen because it allows the monomers to cure at RT without having the solvent evaporate quickly during reaction, while DCM and chloroform could evaporate quickly at RT before the Michael-addition reaction is completed. Dimethylformamide can dissolve RM257 immediately without heating, but requires very high temperatures to remove the solvent (~150° C.).

2. Cool the solution to RT. Add 0.217 g of pentaerythritol tetrakis(3-mercaptopropionate) (PETMP), a tetra-functional thiol crosslinking monomer, and 0.9157 g of 2,2-(ethylenedioxy) diethanethiol (EDDET), a di-thiol monomer. The molar ratio of thiol functional groups between PETMP and EDDET is 15:85. This ratio will be referred to as 15 mol % PETMP throughout the study.

Note: If the RM257 recrystallizes during this process, temporarily place the vial back onto the 80° C. hot plate until the monomer returns to solution. Cool the solution to RT before proceeding to the next steps.

3. (OPTIONAL STEP for adding a global alignment via a second-stage reaction.) Dissolve 0.0257 g of (2-hydroxyethoxy)-2-methylpropiophenone (HEMP) into the solution. HEMP is a photoinitiator used to enable the second-stage photopolymerization reaction. This step can be skipped if the second-stage reaction will not be utilized.

4. Prepare a separate solution of a catalyst by diluting dipropylamine (DPA) with toluene at a ratio of 1:50. Add 0.568 g of diluted catalyst solution to the monomer solution and mix vigorously on a Vortex mixer. This corresponds to 1 mol % of catalyst with respect to the thiol functional groups.

Note: Adding undiluted catalyst, such as DPA, to the solution will likely result in extremely rapid localized polymerization and will prevent manipulation of the polymer solution into the desired mold detailed in the next steps.

5. Place the monomer solution in a vacuum chamber for 1 min at 508 mmHg to remove any air bubbles caused by mixing. Perform this step immediately after mixing.

6. Immediately transfer the solution into the desired mold or, alternatively, inject the solution between two glass slides. Molds should be manufactured from HDPE. The molds do not need to be covered, as the Michael-addition reaction is relatively insensitive to oxygen inhibition.

7. Allow the reaction to proceed for at least 12 hrs. at RT. The solution will begin to gel within the first 30 min.

8. Place samples in a vacuum chamber at 80° C. and 508 mmHg for 24 hrs. to evaporate the toluene. Once completed, the samples should have a glossy white and opaque appearance at RT.

9. (Optional for creating an array of samples for analysis) Repeat the procedure to tailor the ratio of tetra-functional to di-functional thiol monomers for in step 2, including ratios of 25:75 50:50, and 100:0, respectively.

Figure 7:
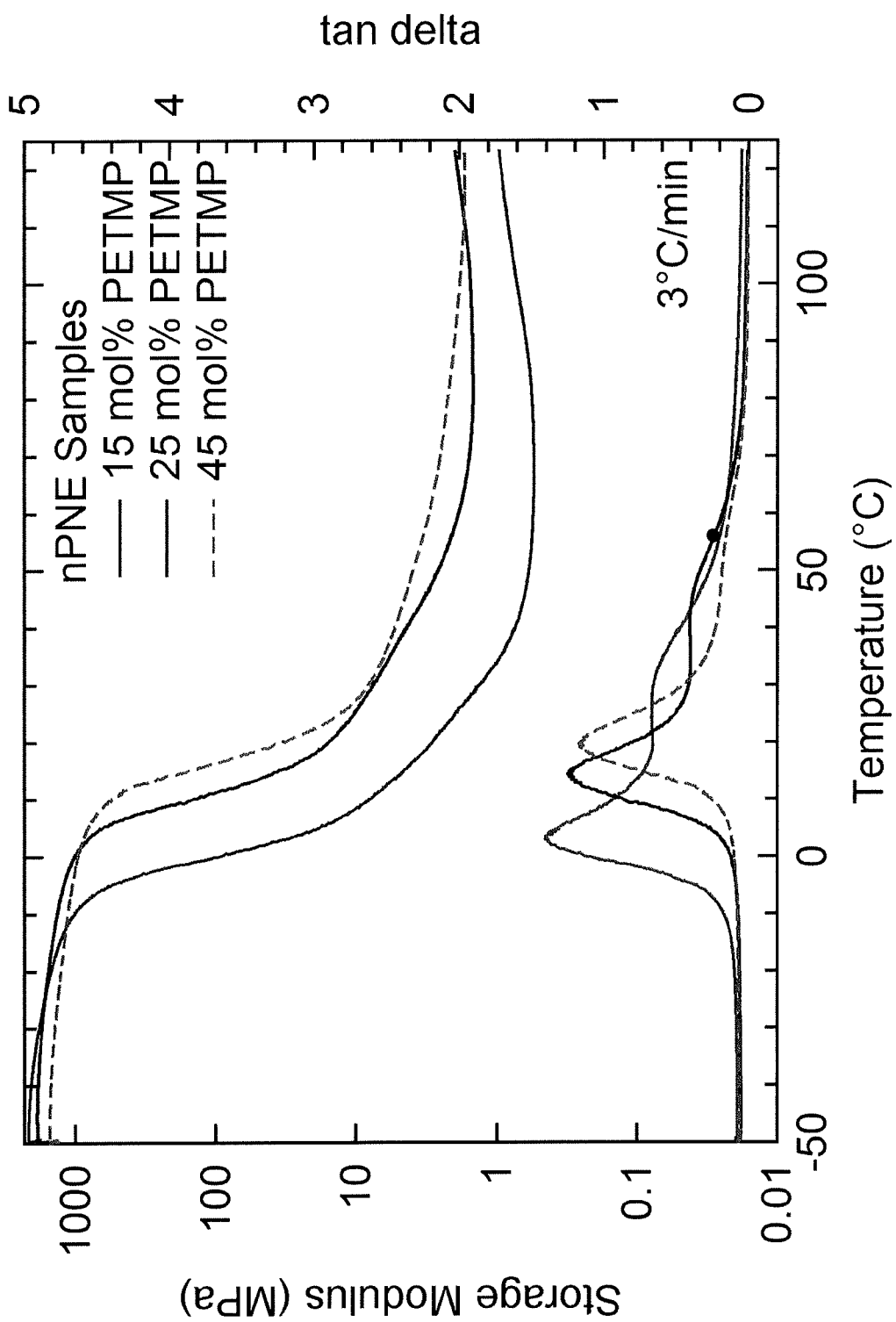
FIG. 7 shows storage modulus and tan delta data for alternative n-PNE networks formed using the same chemistry as the networks in FIG. 5, but with different methods of polymerization to create different structures.

FIG. 7 shows storage modulus and tan delta data for alternative n-PNE networks formed using the same chemistry as the networks in FIG. 5, but with different methods of polymerization to create different structures. These graphs may be used to make comparisons for bodies created using the same LCP chemistries but substituting different techniques for polymerizing the mesogens in solution such that n-PNE structures are formed rather than i-PNE as discussed in several embodiments herein. As one example, the n-PNE bodies shown here may be formed by polymerizing an LCP mesogen solution with a cross-linking initiator at a temperature that is below those described for creating i-PNE, namely below an isotropic transition temperature for the mesogens. As described further herein, creating an n-PNE LCP body may be used to create an alignment that can be used for actuation, such for performing work and/or for shape change, or other properties.

Figure 8:
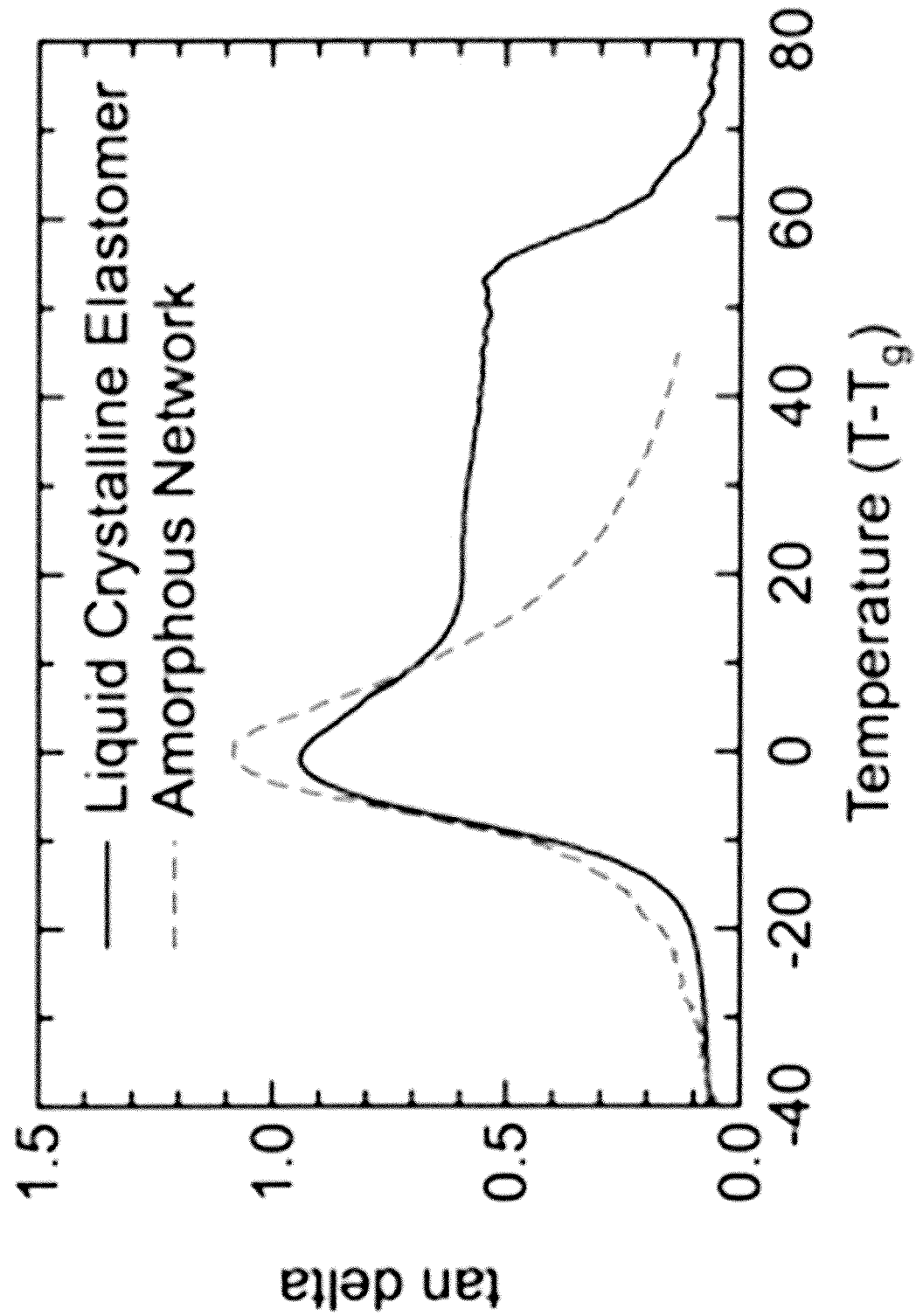
FIG. 8 shows a tan delta comparison between an embodiment of an i-PNE LCP as compared to an exemplary embodiment of an amorphous network.

FIG. 8 shows a tan delta comparison between an embodiment of an i-PNE LCP as compared to an exemplary embodiment of an amorphous network. The amorphous network shows a similar steep peak in tan delta to that of the various n-PNE networks shown and described further herein. The direct comparison shown in this figure is further useful to illustrate selection decisions that may be made when combining different materials, such as metal, other polymers, or other materials in a medical device for use in a patient. These selection decisions may be included in embodiments of the methods for creating the LCP bodies herein. For example, interface materials may be included in an embodiment of a medical device that transmit forces to the i-PNE LCP portion where they are dissipated as described further herein.

Figure 9:
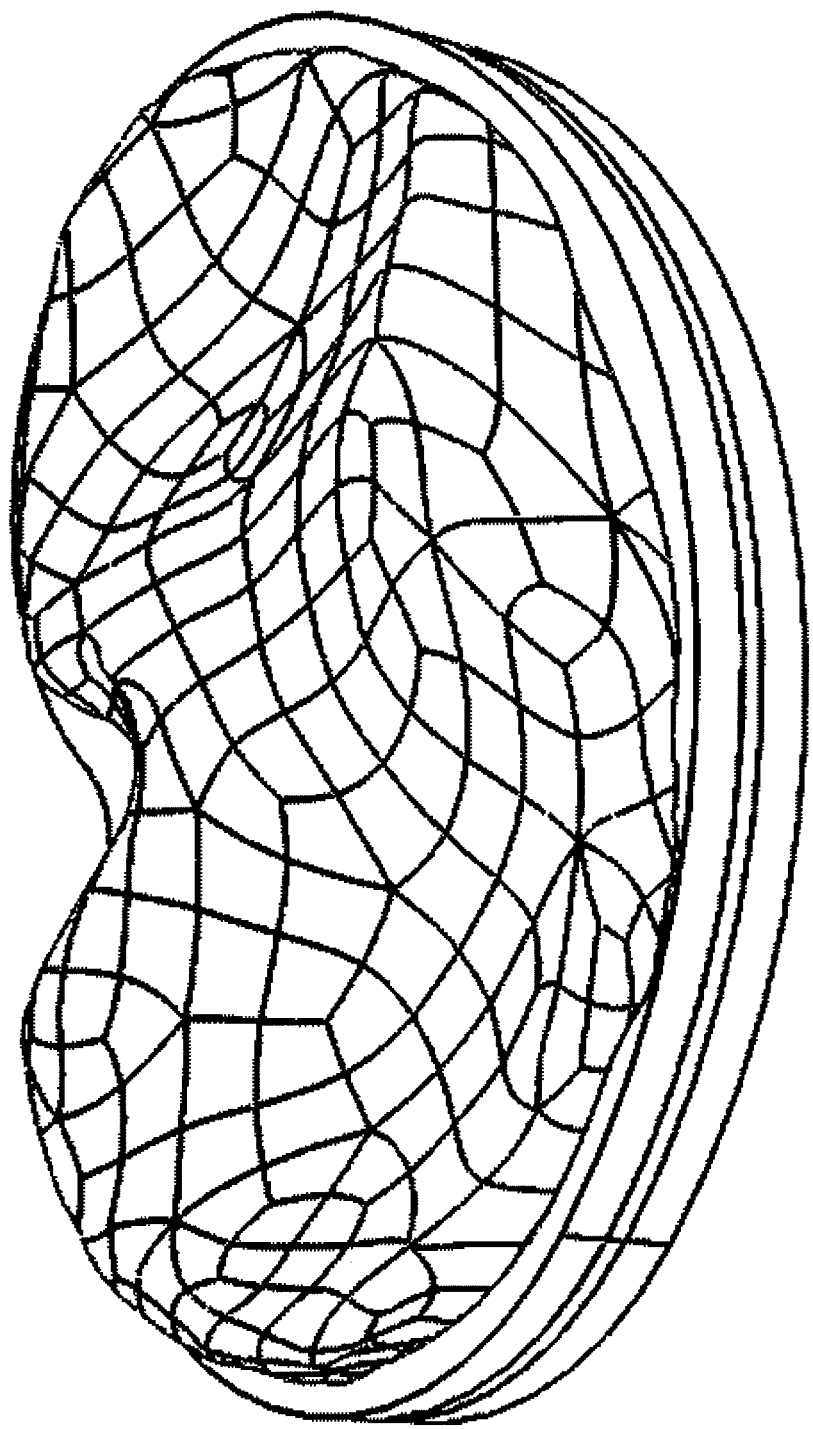
FIG. 9 shows an exemplary embodiment of a medical device with an LCP portion included for maintaining dissipation of shocks above Tg as described further herein.

FIG. 9 shows an exemplary embodiment of a medical device with an LCP portion included for maintaining dissipation of shocks above Tg as described further herein. This embodiment of a medical device is used for knee replacement surgeries and may be adapted to biomimic properties of knee tissue, such as a soft tissue cartilage, using a layer of LCP between interfacing layers of the device.

In the embodiment shown, a layer of LCP is included in the device that is coextensive with other layers of the medical device. For example, other layers of the medical device may be included for their properties that are useful for interfacing the LCP portion with either a part of the patient's body (e.g., a surgically-prepared bone shape of the patient's bone, a natural bone shape of the patient's bone) or another medical device portion. In one embodiment, there may be interfacing layers included in the medical device that include different materials, including other LCP materials (e.g., having different chemistries, having different polymerization histories), that enable both interfacing to a patient and transmitting forces to the LCP layer. For example, interfacing layers may be shaped in order to connect with other portions of the patient or of the medical device or another medical device, such as the shaped knee joint portions shown on the top layer of the medical device.

These interfacing layers may also provide additional complex modulus response for the medical device. For example, another layer of the medical device may augment a complex modulus response of the medical device, such as in a different portion of the device's frequency response. For example, the upper layer of the device shown may be made of polyethylene (PE) which may be designed to augment the complex modulus of the overall medical device (e.g., as measured through all layers of the device). As another example, the lower layer of the device shown may be made of metal to benefit attachment to a prepared bone surface (e.g., via bone screw) and may embody sufficient rigidity to transmit the mechanical shocks from the bone surface to the LCP layer for dissipation as described herein.

Figure 10:
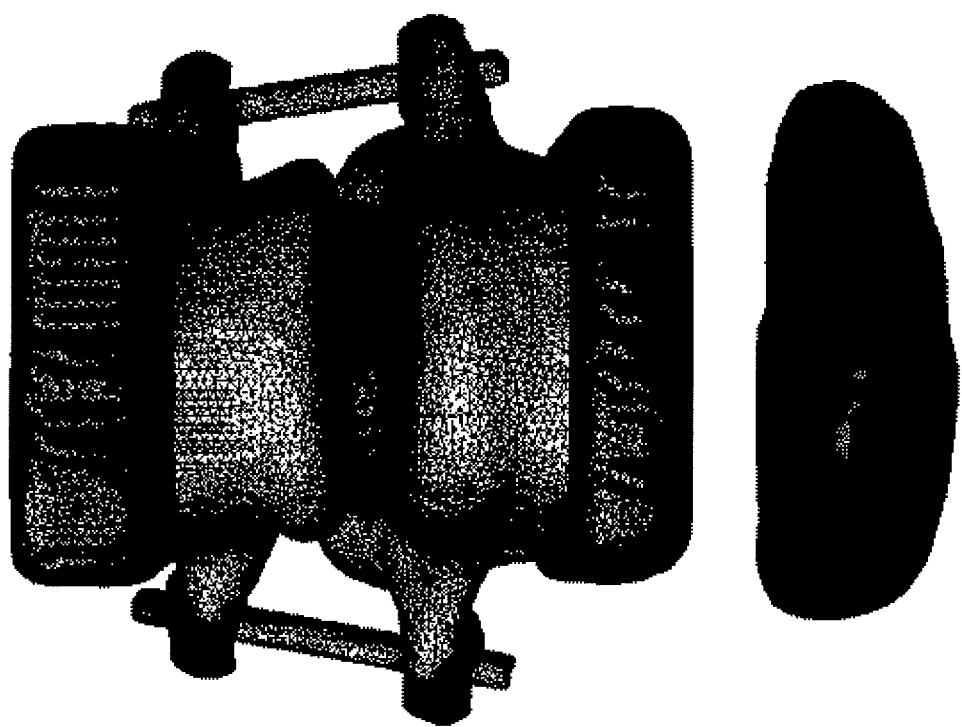
FIG. 10 shows an exemplary embodiment of a medical device consisting of a single LCP body.

FIG. 10 shows an exemplary embodiment of a medical device consisting of a single LCP body. This single LCP body may be composed of multiple LCP portions, which may include LCP portions with different ratios of tan delta to storage modulus and different values of storage modulus, as described further herein. For example, a different polymerization process may be used for one portion of the medical device that is made of a single LCP body.

As introduced above, an intervertebral disc may have a softer central portion that may be made from an i-PNE LCP portion and one or more annular rings of a different chemical formulation (e.g., different mesogen) and/or receiving a different polymerization process. For example, the central portion may have i-PNE LCP body adapted to maintain a storage modulus while providing dissipation in the operating range. In these embodiments, the one or more annular rings surrounding the central portion of the intervertebral disc may be chosen to provide a different range of properties. In another embodiment, a similar central i-PNE LCP portion may be surrounded by one or more annular rings of another material in addition to, or exclusive of other types of LCPs.

Liquid crystal polymers (LCPs) are described herein to include foams that include novel arrangements of properties for the LCP materials and the LCP foam structures created herein. Through the particular synthesis reactions of LCP materials and arrangements of foam structures, the complex modulus of the LCP dampening material may be combined with non-linear apparent modulus effects of the foam structure to create additionally broadened regions of increased as described further herein and in co-pending patent applications. The LCP foams described herein utilize both novel dissipation and impact crushing protection mechanisms to create novel foam responses and energy absorption characteristics. In one aspect, the disclosure describes a method of first creating a liquid crystal polymer (LCP) foam crosslinking mixture with a LCP mesogen mixture and a plurality of porogens, the LCP foam crosslinking mixture adapted for producing an LCP dampening material around the plurality of porogens. The LCP mesogen mixture is adapted for a Michael-addition reaction based on a stoichiometric ratio of functional groups in the LCP mesogen mixture that further includes a functionalized liquid crystal mesogen, a crosslinker sufficient to cause 25 mol % of the stoichiometric functional groups to be supplied by the crosslinker, and a nucleophilic catalyst. The method further includes determining how an LCP foam created from the LCP foam crosslinking mixture will respond to an impact deformation strain on the LCP foam while the LCP foam is below an isotropic transition temperature of the LCP dampening material, wherein the impact deformation crosses a soft-elastic threshold of the LCP foam followed by a subsequent complete unloading of the LCP foam, the LCP foam responding either (i) by recovering from the impact deformation strain by recovering at least 50% of the impact deformation strain or (ii) by maintaining an unrecovered portion of the impact deformation strain that is greater than 50% of the impact deformation strain. The method further includes, based on the determining how the LCP foam will respond to the impact deformation strain, crosslinking the LCP mesogen mixture around the plurality of porogens, thereby second creating the LCP foam from the foam crosslinking mixture. The crosslinking includes if the determining step concludes that the LCP foam will respond by recovering fully, then the crosslinking the LCP mesogen mixture includes performing the crosslinking while the LCP mesogen mixture is at a crosslinking temperature that is below the isotropic transition temperature of the LCP dampening material. The crosslinking also includes, if the determining step concludes that the LCP foam will respond by maintaining an unrecovered portion of the impact deformation strain that is greater than 20% of the impact deformation strain, then, before performing the crosslinking the LCP mesogen mixture around the plurality of porogens, performing an additional step. The additional step may be adding a solvent to the LCP mesogen mixture before performing the step of crosslinking the LCP mesogen mixture. The additional step may be adding a crosslinking initiator to the LCP mesogen mixture before performing the step of crosslinking the LCP mesogen mixture, and performing the crosslinking the LCP mesogen mixture while the LCP mesogen mixture is at a temperature that is above the isotropic transition temperature of the LCP dampening material. The additional step may be performing the step of crosslinking the LCP mesogen mixture while the LCP mesogen mixture is in a dynamic electric field or a dynamic magnetic field. The additional step may also be a combination of steps (a)-(c).

In another aspect, in one embodiment, the disclosure describes the method as further comprising selecting the LCP mesogen mixture such that the LCP dampening material is capable of achieving a target complex modulus via dynamic mechanical analysis (DMA). The target complex modulus includes a tan delta at 1 Hertz, a storage modulus at 1 Hertz and a loss modulus at 1 Hertz. Each of these dynamic characteristics are adapted to achieve the target complex modulus of the LCP dampening material that further maintains a ratio of the tan delta to the storage modulus such that the ratio achieves a maximum that is greater than 1 inverse MPa while the LCP dampening material is at a temperature both that is above a glass transition temperature of the LCP dampening material and that is below an isotropic transition temperature of the LCP dampening material. The method in this aspect further comprises that, after the second creating step, both the LCP dampening material and the LCP foam are capable of achieving the target complex modulus via DMA.

The description also describes that in one embodiment, the functionalized liquid crystal mesogen is a multi-functional acrylate, and wherein the crosslinker is thiol functionalized. The description also describes that in one embodiment, the LCP foam is a first LCP foam, wherein the determining is a first determining step, and wherein the crosslinking is a first crosslinking. In this embodiment, the method includes second determining that a second LCP foam will have an opposite determination from the first determining step. The method also includes third creating the second LCP foam from the crosslinking mixture using a second crosslinking based on the second determining. The method also includes creating the second LCP foam integrally with the first LCP foam using the LCP foam crosslinking mixture and the second crosslinking step. In this embodiment, the second LCP foam has a second recovery behavior in response to the impact deformation strain that is different from a first recovery behavior of the first LCP foam in response to the impact deformation strain. In another embodiment, the method further includes causing recovery of the unrecovered portion of the impact deformation strain of the LCP foam by heating the LCP foam above an isotropic temperature of the LCP dampening material.

Foams have been made in the past using porogens to create pores in a material that is to be foamed (e.g., to be made into a foam) by the creation of pores or voids within the material. Porogens may be hollow spheres, beads, solvate particles, gas-generating particles (e.g., after chemical reaction, upon reaching a temperature). To create the foam, a porogen may be destroyed, shrunken, dissolved, physically removed, or caused to expand (e.g., create gas) in their displacement of the mesogen mixture. For example, a porogen may displace a certain volume of mixture until a temperature is reached at which point a gas will expand from the porogen, increasing the displacement of the porogen (e.g., before reaching a crosslinking temperature) and then crosslinking may be made around the larger displacement. As another example, porogens that are stiffer than the foam may be worked out of the foam mechanically, however, the mechanical action may cause additional opening of the cells cells of the foam to open.

Foams have previously been described in the art as structures eliciting a non-linear stress-strain response, most notable when compression, due to the structure of the foam. See e.g., DiRienzio, et al. "Porous Poly(Para-Phenylene) Scaffolds For Load-Bearing Orthopedic Applications," Journal of the Mechanical Behavior of Biomedical Materials, vol. 30, pgs. 347-357 (February 2014); see also, Ellson, et al., "Tunable Thiol-Epoxy Shape Memory Polymer Foams," Smart Materials Structures, vol. 24, 055001, (2015). These two publications concur that the porous foam structure may create an apparent complex modulus across several different materials types with very different material properties. However, no exploration has been made thus far of the combination of a complex modulus of the LCP dampening materials described and claimed herein with the structural nature of foams to create the novel combinations herein.

The apparent complex modulus of a porous foam results from the structure in combination with the complex modulus of the underlying material forming the foam. The porous foam structure (e.g., created by forming around a porogen) allows foams formed from different types of materials, including soft materials with elastomeric behavior and hard materials with elastic and plastic behavior, to experience structural deformation with 3 distinct stages—(1) Linear elastic response (2) Yielding/Non-linear elasticity, (3) Densification, while the nature of each of these stages is affected by the underlying stress-strain response (complex modulus) of the material. In the first stage, the stress applied to the foamed material is below a threshold needed for strut collapse in the foam structure; therefore, simple linear-elastic loading is experienced on the foam structure of the foamed material. Once a given threshold stress on the foamed material is achieved, the stress-strain behavior flattens out towards a plateau, indicating a transition to the yielding or non-linear elasticity stage of the foam's structural deformation. This plateau may be attributed to the buckling induced by the struts within the foam material. This behavior will continue until the pores of the foam have collapsed, essentially pressing all of the surfaces of the pores together, completing with a process called densification. This threshold of transitioning to the third stage of densification is noticeable by a large spike in stress in response to continued loading/straining as the pore collapse become complete (e.g., statistically throughout the foam, in a portion of the foam with less foaming, smaller pores or other properties).

The literature has also taught that different materials may be foamed such as soft viscoelastic materials or high-strength, high-Tg materials and that as a foam will demonstrate this three-staged behavior in response to compression. It should be noted this three-staged foam behavior is not an effect of the material, but rather the effect of the foam structure itself. While the compression effects can highlight the structural aspects of a foam, dynamic mechanical analysis will reveal that the tan delta of these foamed material structures will closely match their solid material counterparts, as described further herein.

Beyond a certain strain limit, LCPs materials in their solid form demonstrate an inherent "soft elasticity" as part of the material properties, and any foaming of the LCP as described further herein may add another non-linearity to the response of the solid material. LCPs demonstrate this soft elasticity in response to compression via the rearrangement of the mesogens in response to stress elicit a similar behavior—(1) Linear elastic loading, (2) Stress plateau, (3) Sharp increase in stress. As shown further herein, these properties are both retained and enhanced when foaming the LCP material.

Figure 11:
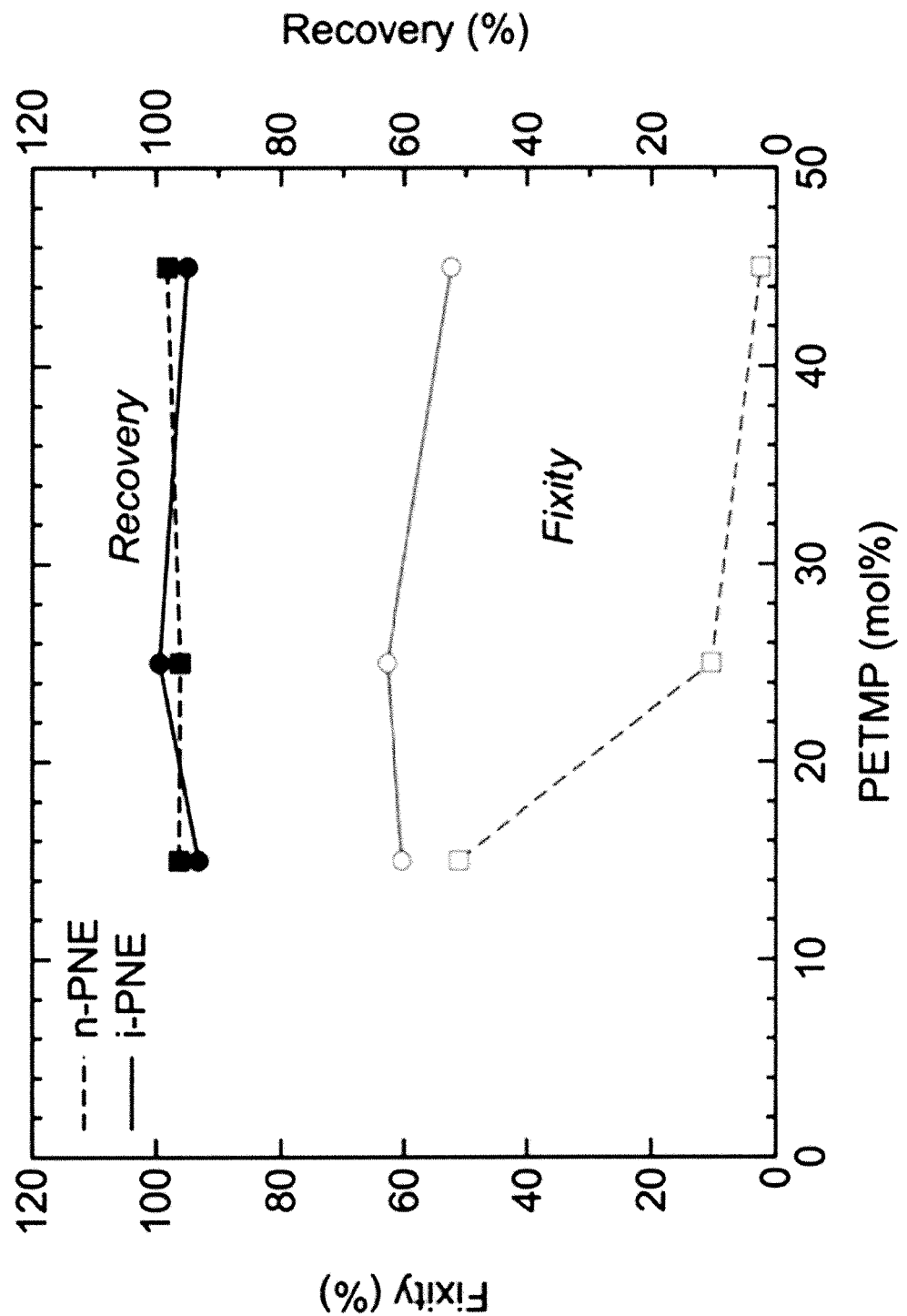
FIG. 11 shows fixity and recovery of an impact deformation strain that has crossed into a soft-elasticity regime of LCP materials under test with a crosslinker mol % of 15%, 25% and 45%.

FIG. 11 shows fixity and recovery of an impact deformation strain that has crossed into a soft-elasticity regime of LCP materials under test with a crosslinker mol % of 15%, 25% and 45%. Crosslinking ratios change the stress-strain behavior, but at higher end of crosslinking the fixity is changed mainly by the selection of n-PNE and i-PNE as described further herein for methods of selecting an LCP mesogen mixture for crosslinking. The samples were prepared and tested for recovery and fixity at different temperatures. The FIG. 11 is reproduced in Traugutt et al, "Liquid-Crystal Order During Synthesis Affects Main-Chain Liquid-Crystal Elastomer Behavior," Soft Materials, DOI: 10.1039/c7sm01405h, (2017), the entire disclosure of which is incorporated herein by reference for all purposes.

The non-linear response of soft-elasticity in an LCE material is not a result of a foaming process but is a property of the LCE material that may be adapted by controlling the features of the LCE synthesis process described herein. The soft-elasticity region for LCP response starts after an initial rise of stress in response to strain, which can appear linear, after which the LCP material provides a soft-elastic plateau in the materials response. As the imparted strain continues to rise (e.g., on an impact deformation strain), there again is a sharp rise in the stress as the LCP material exits the soft-elasticity region.

These soft-elastic responses and fixities have been studied for thin films and not yet for foams as disclosed herein. For example, as described and shown herein, foams created with these described LCP large scale processing techniques that allow for novel structures to be evaluated as described herein.

Furthermore, while a determination to crosslink a particular type of LCP from the foam crosslinking mixture (e.g., including an LCP mesogen mixture and a porogen) as either an n-PNE or an i-PNE material (or some combination thereof) may be used to distinguish the foam's characteristics in fixity and recovery behavior, other characteristics may be changed as described herein and the foam's response may not be predictable from the results of a fixity and recovery on thin films. For example, as described and shown, a much lower crosslinking may be used for achieving characteristics of a complex modulus for DMA analysis where fixity of shape for a single use or resettable foam that crushes and remains with an unrecovered portion of the crushing strain. Alternatively, the differences in fixity between n-PNE and i-PNE materials may be accentuated by adjusting the crosslinking as described herein, thereby changing the complex modulus determination and selections used for matching desired responses.

Foams may be used and created with an array of crushability and recovery, as well as meeting/achieving a certain complex modulus. In one embodiment, it is beneficial to create foam that remains with a significant unrecovered portion of an impact strain after the stress of the impact is removed may be used for any combination of purpose, including creating a one-hit absorbing foam, such as for motorcycle helmets or target absorbing/marking applications. The function of such a one-hit may be for permanently deforming while dissipating an impact, using the permanent deformation for any combination of uses such as increasing the impact dissipating properties of the foam. In the apparent unrecoverable deformation behavior of an LCE foam (e.g., similar to a crushable foam, due to strut yielding and/or fracture), the LCP foam material stays, at least partially, in a compressed shape after extreme loading, demonstrating an unrecovered strain. This is achieved by choosing a processing method that creates i-PNE, particularly with a crosslinking percentage of greater than 25%, as well as including any of the options for disturbing the nematic self-ordering of the LCP while it is forming (e.g., temperature, solvent, electric/magnetic field variations) and thus enforcing the formation of an i-PNE structure.

As described further herein, the i-PNE materials and foams can further recover the otherwise unrecovered strain that remains after an impact, upon heating to and above the Ti of the LCP material to reset the structure, and as shown, may be able to recover nearly or about 100% of the impact deformation strain upon heating. These properties are explored further herein with respect to the novel solution chemistries for producing large scale LCPs as extended beyond these other studies that compared only these standard measures of fixity and recovery of soft-elastic strains.

As described herein, by selecting the appropriate solution chemistry and processing method, the LCE foams can demonstrate the complex modulus described herein and, in response to an impact stress or an extreme stress, a behavior after the impact stress or extreme stress is removed of either full recoverability of its original shape (similar to an elastomeric foam) or an apparent "unrecoverable" or plastic deformation of the foam from its original shape. In addition, portions of the foam may be fabricated differently than other portions, thus demonstrating different combinations of properties, such as a partial recovery, with a recovered portion and an unrecoverable or plastically deformed portion of the recovery. Alternatively, a foam may be fabricated such that full recovery exists for a portion of the foam and while another portion of the foam has unrecoverable deformation.

LCE foams combine these two mechanisms to increase the dissipative properties of the foamed LCE material. As described herein, decisions and determinations may be made in selecting aspects of the mesogens mixture, crosslinking percentage, and crosslinking process for creating an LCE material in a foamed structure. Thereafter, as described herein, the foam may be resettable to achieve 100% recovery of the strain. As described further herein, the i-PNE materials and foams can further recover the otherwise unrecovered strain that remains after an impact, upon heating to and above the Ti of the LCP material to reset the structure, and as shown, may be able to recover 100% of the impact deformation strain upon heating.

Via the processes herein of selecting a correct complex modulus of the LCP dampening material, and selecting an LCP mesogen mixture to create the LCP dampening material, the methods herein can select a tailored foam that exhibits novel combinations of properties.

Figure 12:
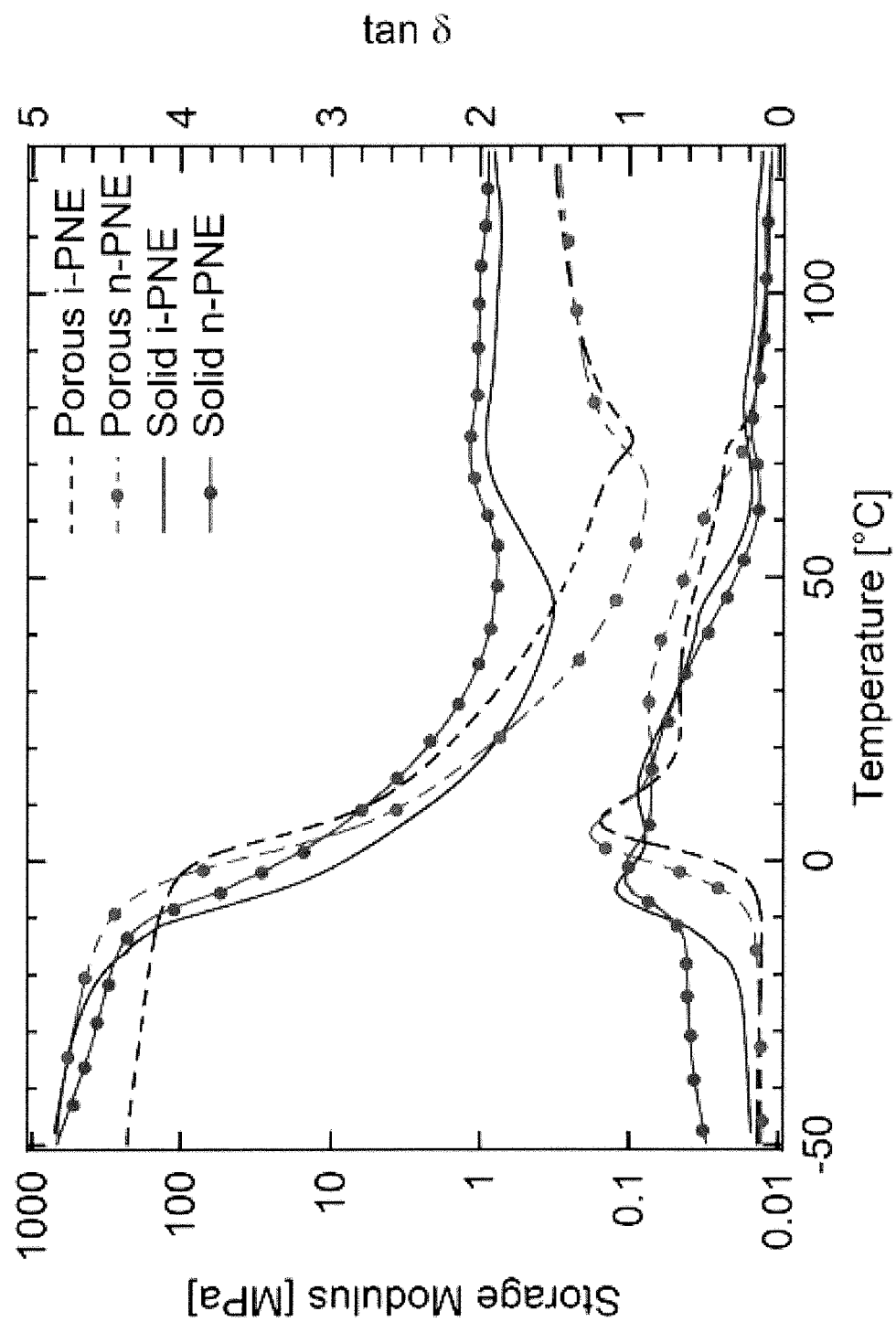
FIG. 12 shows a graph of the measured tan delta and storage modulus as measured for temperatures above Tg for the LCP materials with 2 mol % of crosslinker under DMA test, comparing the foamed format to the solid format of the material both with crosslinking as i-PNE LCP material and as n-PNE LCP material.

FIG. 12 shows a graph of the measured tan delta and storage modulus as measured for temperatures above Tg for the LCP materials with 2 mol % of crosslinker under DMA test, comparing the foamed format to the solid format of the material both with crosslinking as i-PNE LCP material and as n-PNE LCP material. These samples demonstrate the different capabilities that may be changed while selecting the LCP material creation and foaming processes to create an LCP foam. These samples were each made with an LCP mesogen mixture with low crosslinking mol % have limited differences in their recovery from an impact deformation strain that induces soft-elasticity based on the pure material, but nevertheless they still maintain a broad dampening range indicated by the elevated ratios. This is one example of the flexibility provided by the methods herein throughout this disclosure, whereby chemistries may be changed to create some changes to the DMA of the LCP foam, while also separately changing and tailoring the fixity/recovery performance of the foam. Thus, provided herein is a broad and flexible foam platform, as claimed and described herein, for creating very complex dynamic and impact responses to stimuli.

Experimental Details of Exemplary Experimental Method

1. Add 4 g of 4-bis-[4-(3-acryloyloxypropypropyloxy)benzoyloxy]-2-methylbenzene (RM257) into a 30 ml vial. RM257 is a di-acrylate mesogen and is received as a powder.

(Optional Step for i-PNE) Dissolve RM257 by adding 40 wt % (e.g., 1.6 g) of toluene and heat to 80° C. on a hot plate. This process typically takes less than 5 min to dissolve the RM257 into a solution. As described and claimed herein, for n-PNE formation a solvent is not used and crosslinking is performed below the isotropic transition temperature of the LCP material and/or as determined from the LCP mesogens.

Note: Other solvents can be used to dissolve the RM257, such as dichloromethane (DCM), chloroform, and dimethylformamide; however, toluene was chosen because it allows the monomers to cure at Room Temperature (RT ~25° C.) without having the solvent evaporate quickly during reaction, while DCM and chloroform could evaporate quickly at RT before the Michael-addition reaction is completed. Dimethylformamide can dissolve RM257 immediately without heating, but requires very high temperatures to remove the solvent (~150° C.).

2. Cool the solution to RT. Add 0.217 g of pentaerythritol tetrakis(3-mercaptopropionate) (PETMP), a tetra-functional thiol crosslinking monomer, and 0.9157 g of 2,2-(ethylenedioxy) diethanethiol (EDDET), a di-thiol monomer. The molar ratio of thiol functional groups between PETMP and EDDET is 15:85. This ratio will be referred to as 15 mol % PETMP throughout the study.

Samples herein for FIG. 12 were prepared with 2:98% ratio of PETMP and EDDET.

Note: If the RM257 recrystallizes during this process, temporarily place the vial back onto the 80° C. hot plate until the monomer returns to solution. Cool the solution to RT before proceeding to the next steps.

(OPTIONAL STEP for adding a global alignment via a second-stage reaction.) Dissolve 0.0257 g of (2-hydroxyethoxy)-2-methylpropiophenone (HEMP) into the solution. HEMP is a photoinitiator used to enable the second-stage photopolymerization reaction. This step can be skipped if the second-stage reaction will not be utilized.

3. Mix in a porogen of salt crystals into the mesogen mixture ("the monomer solution").

4. Prepare a separate solution of a catalyst by diluting dipropylamine (DPA) with toluene at a ratio of 1:50. Add 0.568 g of diluted catalyst solution to the monomer solution and mix vigorously on a Vortex mixer. This corresponds to 1 mol % of catalyst with respect to the thiol functional groups. In addition using a slower catalyst such as triethylamine (TEA) may be used if a slower reaction is desired, such as for creating n-PNE material below Ti, or where an undiluted catalyst is desired to be used.

Note: Adding undiluted catalyst, such as DPA, to the solution will likely result in extremely rapid localized polymerization and will prevent manipulation of the polymer solution into the desired mold detailed in the next steps.

5. Place the LCP mesogen/monomer solution in a vacuum chamber for 1 min at 508 mmHg to remove any air bubbles caused by mixing. Perform this step immediately after mixing.

6. Immediately transfer the solution into the desired mold or, alternatively, inject the solution between two glass slides. Molds should be manufactured from HDPE. The molds do not need to be covered, as the Michael-addition reaction is relatively insensitive to oxygen inhibition.

7. Allow the reaction to proceed for at least 12 hrs. at RT. The solution will begin to gel within the first 30 min.

8. Place samples in a vacuum chamber at 80° C. and 508 mmHg for 24 hrs. to evaporate the toluene. Once completed, the samples should have a glossy white and opaque appearance at RT.

9. (Optional for creating an array of samples for analysis) Repeat the procedure to tailor the ratio of crosslinker to spacer molecules added (e.g., ratio of tetra-functional to di-functional thiol monomers) for in step 2, including ratios of 10:90, 15:85, 25:75, 45:55, 50:50, and 100:0, respectively.

Porogens are described herein using salt crystals particularly in this embodiment because of their differential solubility in the mesogen mixtures and water. However, other porogens may be used as described herein, such as beads, or hollow spheres and may be dissolved or may remain in part to create the pores/voids in the foam. In one embodiment, the porogens may be attached to each other forming porogen structures before a mixture of mesogens is caused to surround the porogen structure(s). For example, a porogen structure may be a printed two-dimensional array or three-dimensional structure of porogen(s), such as a lattice or honeycomb pattern around which a mixture may be poured. The porogen structures and/or powders may be structures and shapes that allow for a particular shape of the pores. The structures may be adapted to break apart their bonds with each other or have small connections around large pores.

Porogen structures may be functional just as powdered porogens. Functional porogens may grow or shrink to create their displacement within a foam and the structures may adapt this functional basis to allow differential expansion in certain portions of the structure while in physical communication with another part of the structure. For example, part of the breaking apart of a structure into individual pores may be part of the functional action of the porogens or porogen structure to create the desired displacement (e.g., voids) within the foam.

LCP foams described herein may be created for multiple uses based on the chemistries described herein, in co-pending applications, and/or in priority documents. For example, LCP foams created using the selected chemistries described herein demonstrate the same broadened peaks for the LCP materials described herein when tested with DMA testing as shown. The complex modulus of the LCP foams created herein may include both non-linearities created by the LCP dampening material (e.g., dissipating material) and non-linearities created by the foam structure, causing another apparent complex modulus of the foam itself. As shown in FIG. 12, the foaming process may change the apparent complex modulus of the LCP material, but as described and shown further herein, the mesogen mixtures described herein will retain their broadened tan delta peak and ratios described herein as being novel LCP materials properties themselves.

As described further herein, the process of creating pores with a porogen will maintain an apparent similar tan delta but lower apparent storage modulus. For example, as shown in FIG. 12, the ratios of tan delta to storage modulus (expressed in inverse MPa) will further distinguish the claimed foams into the claimed regions of apparent complex moduli, namely maintaining or achieving a ratio of greater that 0.5 inverse MPa, greater than 1.0 inverse MPa, or greater than 2.0 inverse MPa, each of which are not achievable without either using the LCP dampening materials or the LCP foams formed of those materials that are described and claimed herein.

Because a single LCP mesogen mixture may be used to crosslink both i-PNE and n-PNE crosslinking inside of similar LCP materials, including statistical distributions of both i-PNE and n-PNE crosslinking, there are many options for creating gradients of foam properties using the methods herein. For example, because temperature of the mesogen mixture can be used to control whether nematic or isotropic PNE is formed, the temperature of different portions of a mesogen mixture may be changed or controlled to match the desired type of PNE formed. In addition, different catalysts or initiators may be used to control the rate of the reaction, which is further controlled by temperature.

For example, both the degree of fixity/recovery and the DMA properties of the foams described herein may be tailored by statistically modifying the formation of i-PNE and n-PNE bonds within the LCP material to create properties that are further blended and modified by using different techniques to upset or allow nematic ordering during the cross-linking. Therefore, in one embodiment, a single mesogen mixture can be used to create i-PNE and n-PNE domains or regions, including smooth transitions between the two, using various techniques described herein to disturb the nematic ordering during crosslinking. In addition, any combination of techniques may be used to create complex layouts of i-PNE and n-PNE regions within materials, as well as combinations of properties. Therefore, a foam may have several i-PNE and n-PNE regions, including statistical gradients (e.g., populations) of these bonds between regions, that are integrally formed with each other (e.g., attached) via forming from the same LCP foam crosslinking mixture (e.g., where i-PNE will be enforced without a solvent), while exposing different portions of the mixture to different stimuli (e.g., heat, electromagnetic energy, etc).

It is clear that many modifications and variations of this embodiment can be made by one skilled in the art without departing from the spirit of the novel art of this disclosure. While specific parameters, including doping, device configurations, parameters of components, and thresholds may have been disclosed, other reference points can also be used. These modifications and variations do not depart from the broader spirit and scope of the present disclosure, and the examples cited here are illustrative rather than limiting.

What is claimed is:

1. A method comprising:
    receiving a liquid crystal polymer (LCP) mesogen mixture configured to create a nematic elastomer LCP body upon crosslinking a plurality of mesogens in the LCP mesogen mixture;
    crosslinking the plurality of mesogens in the LCP mesogen mixture to create a liquid crystal body;
    wherein during at least a portion of the crosslinking, nematic liquid crystal ordering is disrupted in the plurality of mesogens in the LCP mesogen mixture; and
    creating an isotropic polydomain nematic LCP body.

2. The method of claim 1, wherein the nematic liquid crystal ordering is disrupted via energetically prohibiting forming self-organized nematic structures in the plurality of mesogens in the LCP mesogen mixture.

3. The method of claim 1, wherein the nematic liquid crystal ordering is disrupted when at least a portion of the crosslinking is conducted at a temperature above an isotropic transition temperature of the LCP mesogen mixture.

4. The method of claim 3, wherein the temperature prohibits forming self-organized nematic structures in the plurality of mesogens in the LCP mesogen mixture.

5. The method of claim 1, wherein the nematic liquid crystal ordering is disrupted when at least a portion of the crosslinking is conducted in a dynamic electric field.

6. The method of claim 1, wherein the nematic liquid crystal ordering is disrupted when at least a portion of the crosslinking is conducted in a dynamic magnetic field.

7. The method of claim 1, wherein the LCP mesogen mixture comprises at least one of a crosslinking catalyst or initiator.

8. The method of claim 7, wherein the at least one of a crosslinking catalyst or initiator allows for crosslinking to occur while the plurality of mesogens are above their isotropic transition temperature.

9. The method of claim 7, wherein the at least one of a crosslinking catalyst or initiator is an initiator.

10. The method of claim 9, wherein the initiator is activated via light.

11. The method of claim 1, wherein the LCP mesogen mixture comprises a solvent.

12. The method of claim 1, further comprising forming at least a portion of a medical device with the isotropic polydomain nematic LCP body.

* * * * *